US012365175B2

(12) United States Patent
Ide et al.

(10) Patent No.: US 12,365,175 B2
(45) Date of Patent: Jul. 22, 2025

(54) LIQUID DISCHARGE APPARATUS AND CAPACITIVE LOAD DRIVE CIRCUIT

(71) Applicant: SEIKO EPSON CORPORATION, Tokyo (JP)

(72) Inventors: Noritaka Ide, Shiojriri (JP); Kunio Tabata, Shiojiri (JP); Shoichiro Yokoo, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 237 days.

(21) Appl. No.: 18/187,899

(22) Filed: Mar. 22, 2023

(65) Prior Publication Data

US 2023/0302788 A1 Sep. 28, 2023

(30) Foreign Application Priority Data

Mar. 23, 2022 (JP) ................................ 2022-046480

(51) Int. Cl.
*B41J 2/045* (2006.01)

(52) U.S. Cl.
CPC ....... *B41J 2/04541* (2013.01); *B41J 2/04568* (2013.01); *B41J 2/04581* (2013.01)

(58) Field of Classification Search
CPC .................................................... B41J 2/04568
See application file for complete search history.

(56) References Cited

U.S. PATENT DOCUMENTS

| | | | | |
|---|---|---|---|---|
| 2008/0100652 A1* | 5/2008 | Oshima | B41J 2/04581 347/10 |
| 2011/0109674 A1* | 5/2011 | Oshima | B41J 2/04548 347/10 |
| 2011/0254887 A1* | 10/2011 | Ide | B41J 2/04568 327/111 |
| 2015/0246530 A1 | 9/2015 | Abe et al. | |
| 2016/0221332 A1* | 8/2016 | Sano | B41J 2/04593 |

FOREIGN PATENT DOCUMENTS

JP 2015-164779 A 9/2015

* cited by examiner

*Primary Examiner* — Shelby L Fidler
(74) *Attorney, Agent, or Firm* — Harness, Dickey & Pierce, P.L.C.

(57) ABSTRACT

A liquid discharge apparatus includes a liquid discharge head that includes a plurality of capacitive loads driven by being supplied with a drive signal and discharges a liquid by driving the plurality of capacitive loads, and a capacitive load drive circuit, in which the capacitive load drive circuit includes a correction circuit, a modulation circuit, an amplification circuit, a demodulation circuit, and a feedback circuit, and the correction circuit outputs the correction base drive signal corrected according to the number of drive capacitive loads driven by the drive signal among the plurality of capacitive loads.

10 Claims, 13 Drawing Sheets

| | | FD | ND |
|---|---|---|---|
| [SId] | | [1] | [0] |
| S | T | H | L |

LIQUID DISCHARGE APPARATUS AND CAPACITIVE LOAD DRIVE CIRCUIT

The present application is based on, and claims priority from JP Application Serial Number 2022-046480, filed Mar. 23, 2022, the disclosure of which is hereby incorporated by reference herein in its entirety.

BACKGROUND

1. Technical Field

The present disclosure relates to a liquid discharge apparatus and a capacitive load drive circuit.

2. Related Art

As a liquid discharge apparatus that discharges a liquid to form an image or a document on a medium, a liquid discharge apparatus using a capacitive load such as a piezoelectric element is known. In such a liquid discharge apparatus, the capacitive load is provided corresponding to each of a plurality of nozzles that discharge the liquid, and each is driven according to a drive signal. By driving the capacitive load, the liquid is discharged from a nozzle provided corresponding to the capacitive load. It is necessary to supply a sufficient current in order to operate such a capacitive load. Therefore, a capacitive load drive circuit that outputs the drive signal for driving the capacitive load is configured to include an amplification circuit that amplifies a source signal on which the drive signal is based by the amplification circuit.

JP-A-2015-164779 discloses a drive circuit (capacitive load drive circuit) that outputs a drive signal for driving a piezoelectric element which is one of the capacitive loads, and includes a class D amplification circuit as an amplification circuit.

However, from the viewpoint of further improving a discharge accuracy of a liquid in a liquid discharge apparatus, and of further improving a waveform accuracy of a drive signal output by a capacitive load drive circuit, a technique described in JP-A-2015-164779 is not sufficient and there is room for improvement.

SUMMARY

According to an aspect of the present disclosure, there is provided a liquid discharge apparatus including a liquid discharge head that includes a plurality of capacitive loads driven by being supplied with a drive signal and discharges a liquid by driving the plurality of capacitive loads, and a capacitive load drive circuit that outputs the drive signal, in which the capacitive load drive circuit includes a correction circuit that outputs a correction base drive signal obtained by correcting a base drive signal which is a base of the drive signal, a modulation circuit that outputs a modulation signal obtained by modulating the correction base drive signal, an amplification circuit that outputs an amplified modulation signal obtained by amplifying the modulation signal, a demodulation circuit that includes a capacitor and outputs the drive signal by demodulating the amplified modulation signal, and a feedback circuit that feeds back the drive signal to the correction circuit, in which the correction circuit outputs the correction base drive signal corrected according to the number of drive capacitive loads driven by the drive signal among the plurality of capacitive loads.

According to still another aspect of the present disclosure, there is provided a capacitive load drive circuit that includes a plurality of capacitive loads to be driven by being supplied with a drive signal and outputs the drive signal to a liquid discharge head which discharges a liquid by driving the plurality of capacitive loads, the circuit including a correction circuit that outputs a correction base drive signal obtained by correcting a base drive signal which is a base of the drive signal, a modulation circuit that outputs a modulation signal obtained by modulating the correction base drive signal, an amplification circuit that outputs an amplified modulation signal obtained by amplifying the modulation signal, a demodulation circuit that includes a capacitor and outputs the drive signal by demodulating the amplified modulation signal, and a feedback circuit that feeds back the drive signal to the correction circuit, in which the correction circuit outputs the correction base drive signal corrected according to the number of drive capacitive loads driven by the drive signal among the plurality of capacitive loads.

DESCRIPTION OF EXEMPLARY EMBODIMENTS

Hereinafter, preferred embodiments of the present disclosure will be described with reference to the drawings. The drawings used are for convenience of description. The embodiments described below do not unreasonably limit the content of the present disclosure described in the aspects. In addition, not all of the configurations described below are essential constituent requirements of the present disclosure.

In the following description, an ink jet printer for a consumer is used as an example of a liquid discharge apparatus according to the present disclosure. However, the liquid discharge apparatus is not limited to an ink jet printer for a consumer, and may be, for example, a coloring material discharge apparatus used for manufacturing a color filter such as a liquid crystal display, an electrode material discharge apparatus used for forming an electrode such as an organic EL display and a surface emission display, and a bioorganic substance discharge apparatus used for manufacturing a biochip.

1. First Embodiment

1.1 Configuration of Liquid Discharge Apparatus

Figure 1:
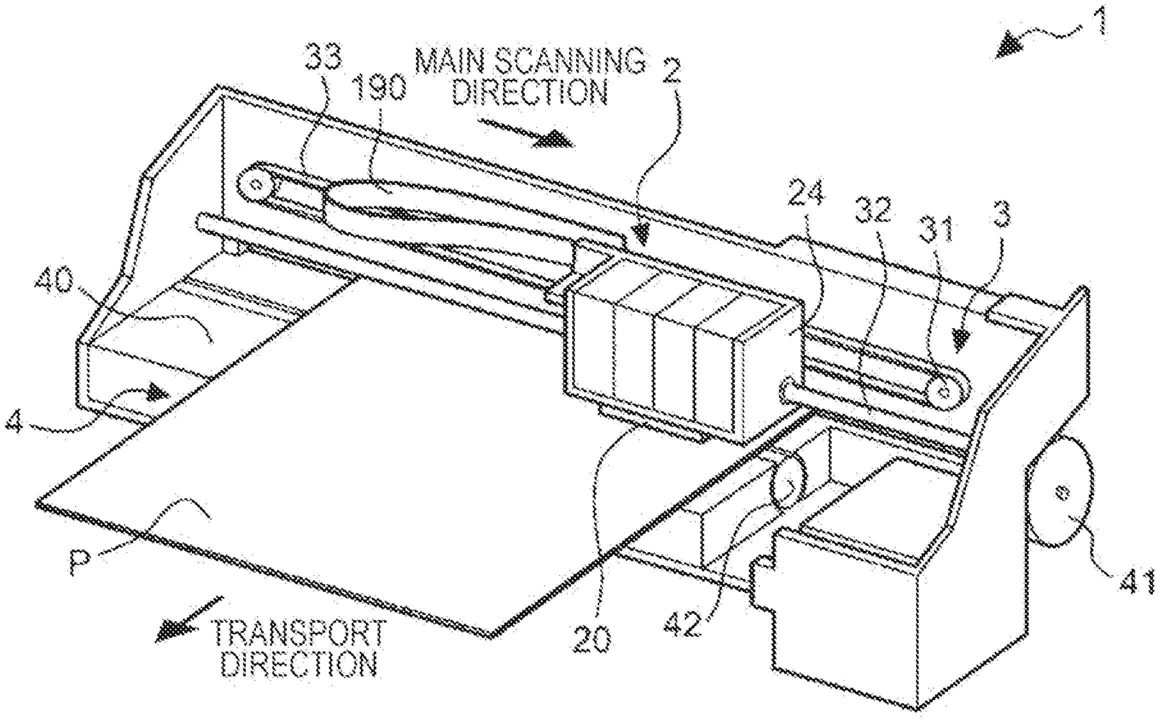
FIG. 1 is a view illustrating an example of a structure of a liquid discharge apparatus.

FIG. 1 is a view illustrating an example of a structure of a liquid discharge apparatus 1. As illustrated in FIG. 1, the liquid discharge apparatus 1 is provided with a moving object 2 and a moving unit 3 that reciprocates the moving object 2 along the main scanning direction.

The moving unit 3 includes a carriage motor 31 that serves as a drive source for reciprocating movement of the moving object 2 along the main scanning direction, a carriage guide shaft 32 that has both ends fixed, and a timing belt 33 that extends substantially parallel to the carriage guide shaft 32 and is driven by the carriage motor 31.

The moving object 2 includes a carriage 24. The carriage 24 is supported by the carriage guide shaft 32 so as to be able to reciprocate and is fixed to a portion of the timing belt 33. The timing belt 33 travels forward and rearward by the carriage motor 31, so that the moving object 2 having the carriage 24 is guided by the carriage guide shaft 32 to reciprocate. In addition, a head unit 20 is located in a portion of the moving object 2 facing a medium P. That is, the head unit 20 is mounted on the carriage 24. Multiple nozzles that discharge an ink as a liquid are located on a surface of the head unit 20 facing the medium P. In addition, various control signals for controlling the operation of the head unit 20 are supplied to the head unit 20 via a cable 190. As such a cable 190, a flexible flat cable or the like that can slide following the reciprocating movement of the moving object 2 can be used.

In addition, the liquid discharge apparatus 1 is provided with a transport unit 4 for transporting the medium P on a platen 40 along a transport direction. The transport unit 4 includes a transport motor 41 that is a drive source for transporting the medium P, and a transport roller 42 that transports the medium P along the transport direction by being rotated by the transport motor 41.

In the liquid discharge apparatus 1 configured as described above, the head unit 20 discharges the ink on the medium P in synchronization with the timing when the medium P is transported by the transport unit 4. As a result, the ink discharged by the head unit 20 lands at a desired position on the medium P, and as a result, a desired image or character is formed on the surface of the medium P.

Figure 2:
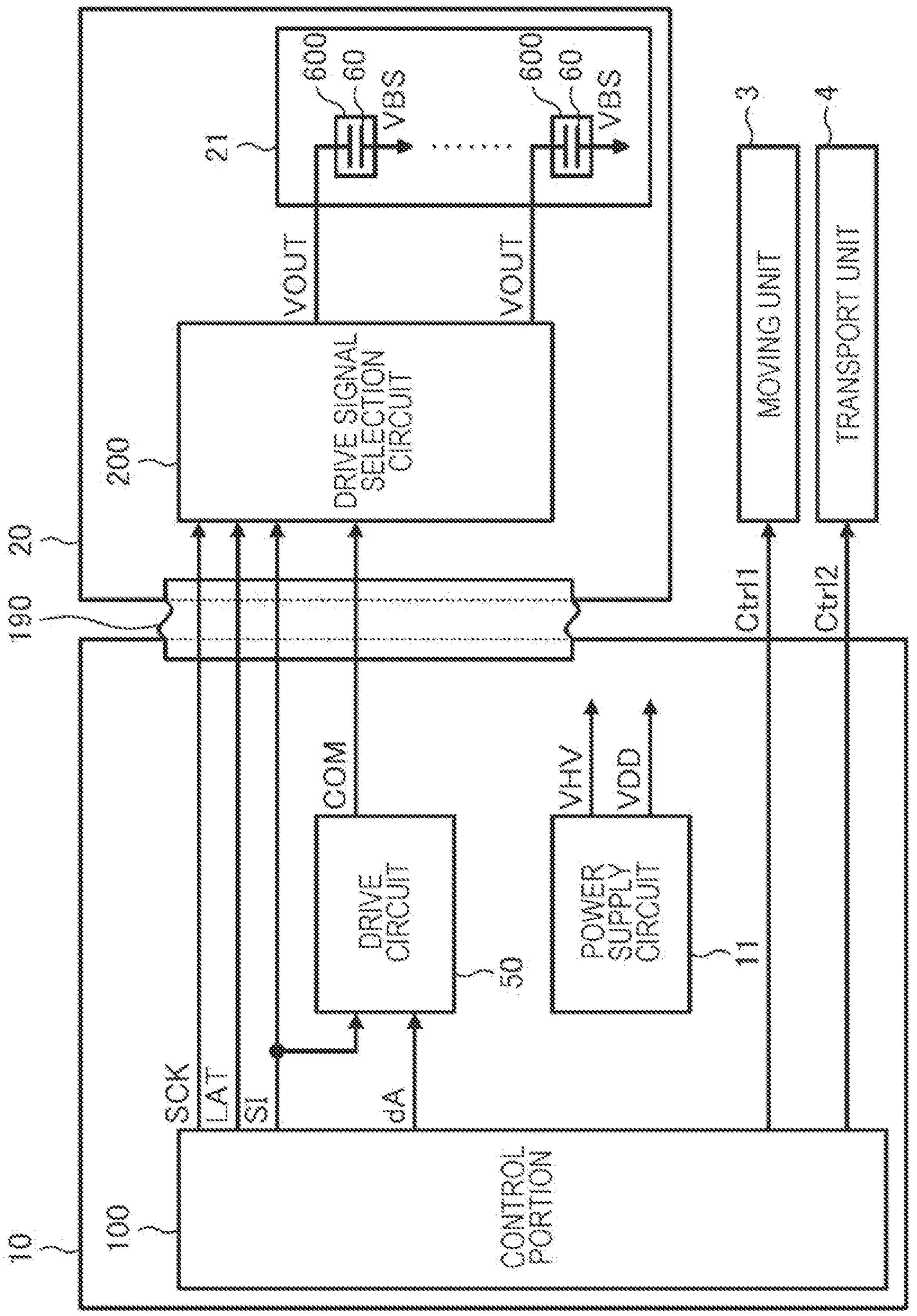
FIG. 2 is a diagram illustrating an example of a functional configuration of the liquid discharge apparatus.

Next, a functional configuration of the liquid discharge apparatus 1 will be described. FIG. 2 is a diagram illustrating an example of the functional configuration of the liquid discharge apparatus 1. As illustrated in FIG. 2, the liquid discharge apparatus 1 is provided with a control unit 10, a head unit 20, a moving unit 3, a transport unit 4, and a cable 190. The cable 190 electrically couples the control unit 10 and the head unit 20.

The control unit 10 includes a power supply circuit 11, a control portion 100, and a drive circuit 50.

The power supply circuit 11 generates voltage signals VHV and VDD having a predetermined voltage value from a commercial AC power supply supplied from the outside of the liquid discharge apparatus 1, and outputs the voltage signals to the various components of the liquid discharge apparatus 1. Here, the voltage signal VHV output by the power supply circuit 11 is, for example, a DC voltage of 42 V, and the voltage signal VDD is, for example, a DC voltage of 3.3 V. Such a power supply circuit 11 is configured to include, for example, an AC/DC converter that generates a voltage signal VHV from a commercial AC power supply and a DC/DC converter that generates a voltage signal VDD from the voltage signal VHV. The power supply circuit 11 may output DC voltages having different voltage values in addition to the voltage signals VHV and VDD.

An image data is supplied to the control portion 100 from an external device (not illustrated) provided outside the liquid discharge apparatus 1, for example, from a host computer or the like. The control portion 100 generates various control signals for controlling each part of the liquid discharge apparatus 1 by performing various image processing and the like on the supplied image data, and outputs the various control signals to the corresponding configurations.

Specifically, the control portion 100 generates a control signal Ctrl1 for controlling the reciprocating movement of the moving object 2 and outputs the control signal Ctrl1 to the carriage motor 31 included in the moving unit 3. In addition, the control portion 100 generates a control signal Ctrl2 for controlling the transport of the medium P, and outputs the control signal Ctrl2 to the transport motor 41 included in the transport unit 4. As a result, the reciprocating movement of the moving object 2 along the main scanning direction and the transport of the medium P along the transport direction are controlled by the control portion 100. As a result, the head unit 20 can discharge the ink on the medium P at a predetermined timing synchronized with the transport of the medium P. As a result, the ink lands at a desired position on the medium P, and a desired image or character can be formed on the medium P.

The control portion 100 may supply the control signal Ctrl1 for controlling the reciprocating movement of the moving object 2 to the moving unit 3 via a carriage motor driver (not illustrated). Similarly, the control portion 100 may supply the control signal Ctrl2 for controlling the transport of the medium P to the transport unit 4 via a transport motor driver (not illustrated).

In addition, the control portion 100 outputs a base drive signal dA to the drive circuit 50. The base drive signal dA output by the control portion 100 is a signal including data defining a waveform of the drive signal COM supplied to the head unit 20, and is, for example, a digital signal. The drive circuit 50 converts the input digital base drive signal dA into an analog signal, and then amplifies the converted signal to generate a drive signal COM. The drive circuit 50 supplies the generated drive signal COM to the head unit 20. The details of the configuration and operation of the drive circuit 50 will be described later.

In addition, the control portion 100 generates a clock signal SCK, a latch signal LAT, and a print data signal SI for controlling the operation of the head unit 20, and outputs these signals to the head unit 20.

The head unit 20 includes a drive signal selection circuit 200 and a liquid discharge head 21. In addition, the liquid discharge head 21 includes a plurality of discharge portions 600, and each of the plurality of discharge portions 600 includes a piezoelectric element 60. In the following description, the number of discharge portions 600 included in the liquid discharge head 21 may be described as n.

The clock signal SCK, the latch signal LAT, and the print data signal SI are input to the drive signal selection circuit 200. The drive signal selection circuit 200 switches whether or not to supply the drive signal COM as the drive signal VOUT to one end of the piezoelectric element 60 included in each of the plurality of discharge portions 600 in a period defined by the latch signal LAT based on the print data signal SI propagated by the clock signal SCK.

In addition, a reference voltage signal VBS is supplied to the other end of the piezoelectric element 60 included in each of the plurality of discharge portions 600. The reference voltage signal VBS is a signal that functions as a reference potential for driving the piezoelectric element 60 driven by the drive signal VOUT, and is, for example, a signal having a constant potential such as 5.5 V, 6 V, or a ground potential.

The piezoelectric element 60 is driven according to the potential difference between the drive signal VOUT supplied to one end and the reference voltage signal VBS supplied to the other end. By driving the piezoelectric element 60, ink is discharged from the discharge portion 600 including the piezoelectric element 60.

Although FIG. 2 illustrates when the head unit 20 has one liquid discharge head 21, the number of liquid discharge heads 21 included in the head unit 20 is not limited to one, and the head unit 20 may have a plurality of liquid discharge heads 21 according to the type and number of inks to be discharged.

As described above, the liquid discharge apparatus 1 in the present embodiment is provided with a plurality of piezoelectric elements 60 that are driven by being supplied with the drive signals COM and VOUT, the liquid discharge head 21 that discharges ink as an example of liquid by driving the plurality of piezoelectric elements 60, and the drive circuit 50 that outputs the drive signal COM.

1.2 Configuration and Operation of Discharge Portion

Figure 3:
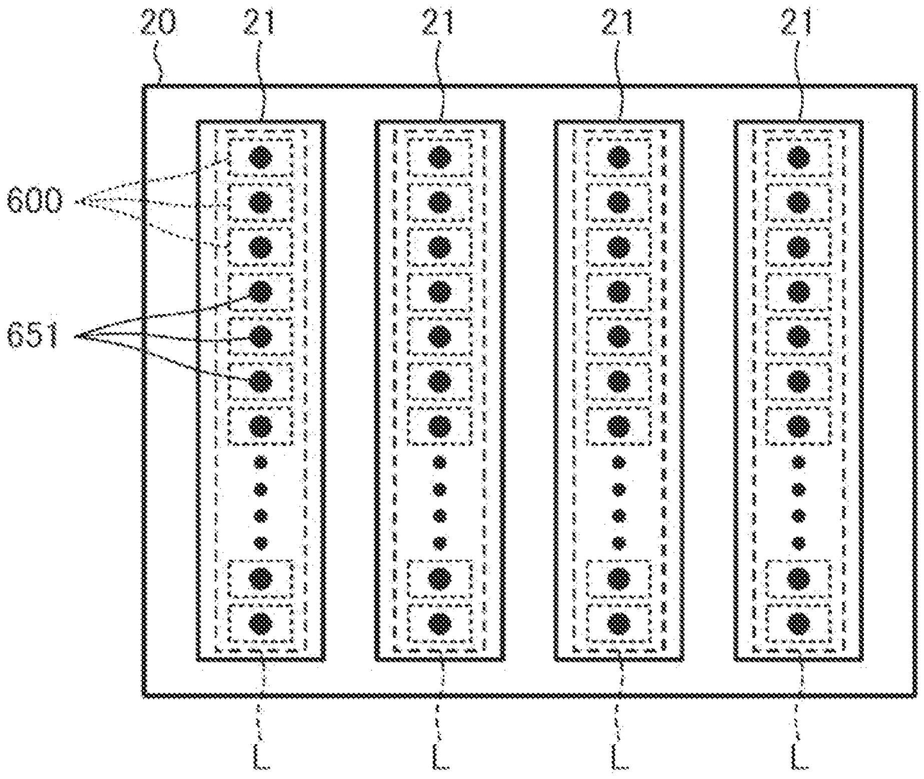
FIG. 3 is a diagram illustrating an example of arrangement of a plurality of discharge portions in a head unit.

Next, a configuration of the plurality of discharge portions 600 included in the head unit 20 and an example of arrangement of the plurality of discharge portions 600 in the head unit 20 will be described. FIG. 3 is a diagram illustrating an example of arrangement of the plurality of discharge portions 600 in the head unit 20. FIG. 3 illustrates when the head unit 20 includes four liquid discharge heads 21.

As illustrated in FIG. 3, each of the four liquid discharge heads 21 includes the plurality of discharge portions 600 provided in a row in one direction. That is, the liquid discharge head 21 includes a nozzle row L in which nozzles 651, which will be described later, included in the discharge portion 600 are arranged in one direction. In addition, the liquid discharge heads 21 are located side by side in the head unit 20 in a direction intersecting the nozzle row L. That is, the head unit 20 is formed with the same number of nozzle rows L as the number of liquid discharge heads 21. The arrangement of the nozzles 651 in the nozzle row L included in the liquid discharge head 21 is not limited to one row, and for example, even-numbered nozzles 651 counted from one end portion of the plurality of nozzles 651 and odd-numbered nozzles 651 counted from one end portion of the plurality of nozzles 651 may be arranged in a staggered manner so that the positions of the nozzles 651 are different. In the liquid discharge head 21, one nozzle row L may be formed by arranging the plurality of nozzles 651 in two or more rows.

Figure 4:
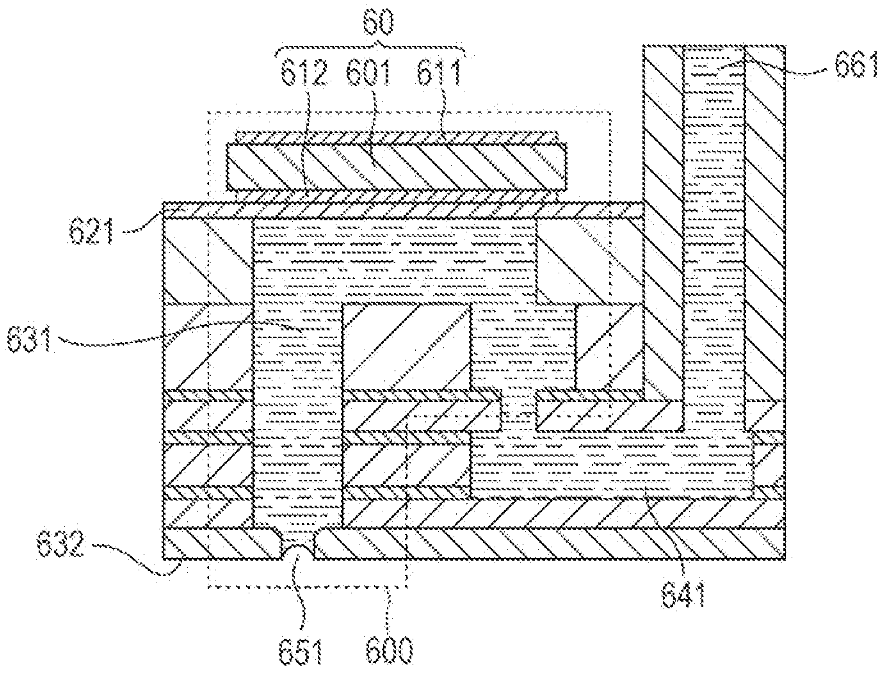
FIG. 4 is a diagram illustrating an example of a configuration of a discharge portion.

Next, an example of a configuration of the discharge portion 600 will be described. FIG. 4 is a diagram illustrating an example of the configuration of the discharge portion 600. As illustrated in FIG. 4, the discharge portion 600 includes a piezoelectric element 60, a diaphragm 621, a cavity 631, and a nozzle 651. The diaphragm 621 is displaced as the piezoelectric element 60 provided on the upper surface in FIG. 4 is driven. That is, the diaphragm 621 functions as a diaphragm that expands/contracts the internal volume of the cavity 631. The inside of the cavity 631 is filled with ink. The cavity 631 functions as a pressure chamber in which internal volume changes due to displacement of the diaphragm 621 due to driving of the piezoelectric element 60. The nozzle 651 is an opening portion formed in the nozzle plate 632 and communicating with the cavity 631. As the internal volume of the cavity 631 changes, the ink stored inside the cavity 631 is discharged from the nozzle 651.

The piezoelectric element 60 has a structure in which a piezoelectric body 601 is interposed between a pair of electrodes 611 and 612. In the piezoelectric body 601 having this structure, the electrodes 611 and 612 and the central portion of the diaphragm 621 are bent in the vertical direction in FIG. 4 with respect to both end portions according to a potential difference between the electrodes 611 and 612.

Specifically, the drive signal VOUT is supplied to the electrode 611, which is one end of the piezoelectric element 60, and the reference voltage signal VBS is supplied to the electrode 612, which is the other end. When the piezoelectric element 60 is driven upward in response to a change in the voltage value of the drive signal VOUT, the diaphragm 621 is displaced upward, and as a result, the internal volume of the cavity 631 is expanded. Therefore, the ink stored in a reservoir 641 is drawn into the cavity 631. On the other hand, when the piezoelectric element 60 is driven downward in response to a change in the voltage value of the drive signal VOUT, the diaphragm 621 is displaced downward, and as a result, the internal volume of the cavity 631 is reduced. Therefore, an amount of ink corresponding to the degree of reduction in the internal volume of the cavity 631 is discharged from the nozzle 651.

As described above, the liquid discharge head 21 includes the piezoelectric element 60, and discharges ink on the medium P by driving the piezoelectric element 60. The piezoelectric element 60 and the discharge portion 600 are not limited to the structure illustrated, and may be any structure as long as the ink can be discharged from the nozzle 651 by displacing the piezoelectric element 60.

1.3 Configuration and Operation of Selection Control Circuit

Next, the configuration and operation of the drive signal selection circuit 200 will be described. As described above, the drive signal selection circuit 200 switches whether or not to supply the drive signal VOUT based on the drive signal COM to the piezoelectric element 60 included in each of the plurality of discharge portions 600 based on the clock signal SCK, the latch signal LAT, and the print data signal SI. Therefore, in describing the configuration and operation of the drive signal selection circuit 200, first, an example of a signal waveform of the drive signal COM supplied to the drive signal selection circuit 200 will be described.

Figure 5:
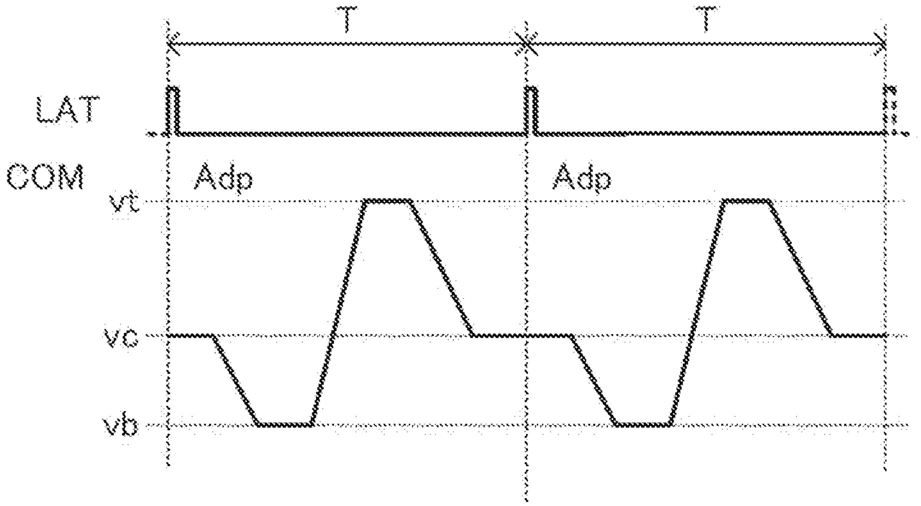
FIG. 5 is a graph illustrating an example of a signal waveform of a drive signal.

FIG. 5 is a graph illustrating an example of the signal waveform of the drive signal COM. As illustrated in FIG. 5, the drive signal COM includes a trapezoidal waveform Adp for each cycle T from when the latch signal LAT rises to when the latch signal LAT next rises. The trapezoidal waveform Adp includes a constant period at voltage vc, a constant period at voltage vb, which has a lower voltage value than voltage vc, following the constant period at voltage vc, a constant period at voltage vt, which has a higher voltage value than voltage vc, following the constant period at voltage vb, and a constant period at voltage vc, following a constant period at voltage vt. That is, the drive signal COM includes a trapezoidal waveform Adp that starts at a voltage vc and ends at a voltage vc. Here, in the following description, the potential difference between the voltage vt and the voltage vb in the drive signal COM may be referred to as an amplitude of the drive signal COM.

The voltage vc corresponds to a potential that is a reference for the displacement of the piezoelectric element 60. The voltage value of the drive signal COM supplied to the piezoelectric element 60 changes from the voltage vc to the voltage vb, so that the piezoelectric element 60 is driven upward as illustrated in FIG. 4. As a result, the diaphragm 621 is displaced upward as illustrated in FIG. 4. The diaphragm 621 is displaced upward as illustrated in FIG. 4, so that the internal volume of the cavity 631 expands, and ink is drawn from the reservoir 641 into the cavity 631. Thereafter, the voltage value of the drive signal COM supplied to the piezoelectric element 60 changes from the voltage vb to the voltage vt, so that the piezoelectric element 60 is driven downward as illustrated in FIG. 4. As a result, the diaphragm 621 is displaced downward as illustrated in FIG. 4. The diaphragm 621 is displaced downward as illustrated in FIG. 4, so that the internal volume of the cavity 631 is reduced, and the ink stored in the cavity 631 is discharged from the nozzle 651.

In addition, for a certain period of time after the ink is discharged from the nozzle 651 by driving the piezoelectric element 60, the ink in the vicinity of the nozzle 651 or the diaphragm 621 may continue to vibrate. The certain period at the voltage vc included in the drive signal COM also functions as a period for stopping the vibration not contributing to the discharge of such an ink or the ink generated in the diaphragm 621.

Here, the signal waveform of the drive signal COM illustrated in FIG. 5 is an example, is not limited thereto, and may include various shapes of signal waveforms according to the physical properties of the ink discharged by the liquid discharge head 21, the length of the cycle T of the drive signal COM, the transport speed of the medium P, and the like.

Figure 6:
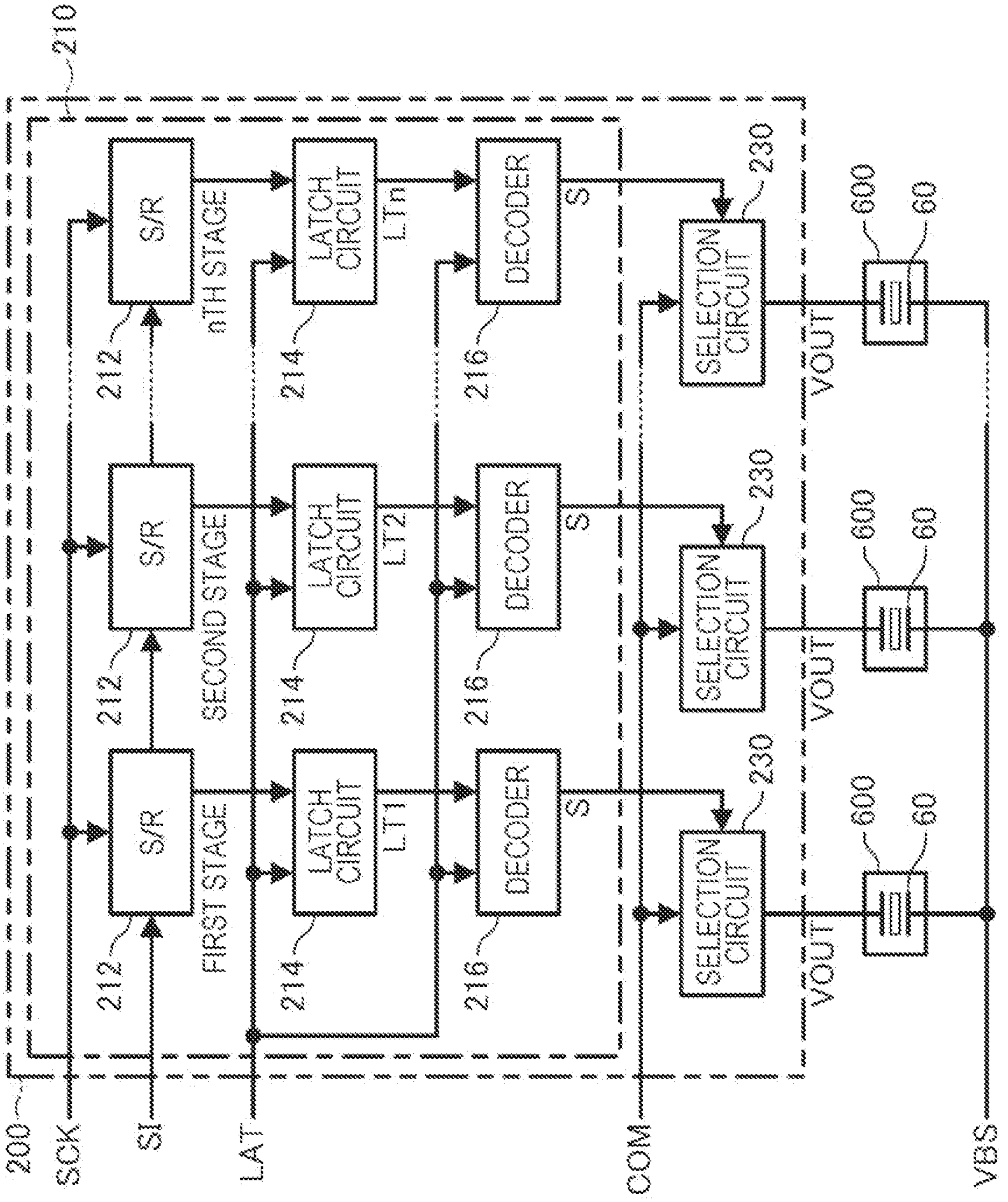
FIG. 6 is a diagram illustrating an example of a configuration of a drive signal selection circuit.

Next, the configuration and operation of the drive signal selection circuit 200 that generates the drive signal VOUT by selecting or not selecting the signal waveform included in the drive signal COM will be described. FIG. 6 is a diagram illustrating an example of the configuration of the drive signal selection circuit 200. As illustrated in FIG. 6, the drive signal selection circuit 200 includes a selection control circuit 210 and n selection circuits 230.

The clock signal SCK, the print data signal SI, and the latch signal LAT are input to the selection control circuit 210. In addition, the selection control circuit 210 includes a set of a shift register (S/R) 212, a latch circuit 214, and a decoder 216 corresponding to each of the n discharge portions 600. That is, the drive signal selection circuit 200 includes n shift registers 212, n latch circuits 214, and n decoders 216.

The print data signal SI is input to the selection control circuit 210 in synchronization with the clock signal SCK. The print data signal SI serially includes print data [SId] for selecting "discharge FD" in which dots are formed on the medium P by discharging ink from the discharge portion 600, and "non-discharge ND" in which dots are not formed on the medium P by not discharging ink from the discharge portion 600 corresponding to each of the n discharge portions 600. That is, the print data signal SI is a serial signal of n bits or more.

The print data [SId] included in the print data signal SI is held in n shift registers 212 corresponding to n discharge portions 600. Specifically, n shift registers 212 corresponding to the discharge portion 600 are vertically coupled to each other, and the serially input print data signal SI is sequentially transferred to the subsequent shift register 212 according to the clock signal SCK. The print data [SId] is held in the corresponding shift register 212, so that the supply of the clock signal SCK is stopped. In other words, when the supply of the clock signal SCK is stopped, the print data [SId] included in the print data signal SI is held in the corresponding shift register 212. In FIG. 6, in order to distinguish the n shift registers 212, the shift registers are expressed as a first stage, a second stage, . . . , and an nth stage in order from the upstream to the downstream where the print data signal SI is input.

Each of the n latch circuits 214 latches simultaneously the print data [SId] held in the corresponding shift register 212 when the latch signal LAT rises. The print data [SId] latched by the latch circuit 214 is input to the corresponding decoder 216.

Figures 7, 8:
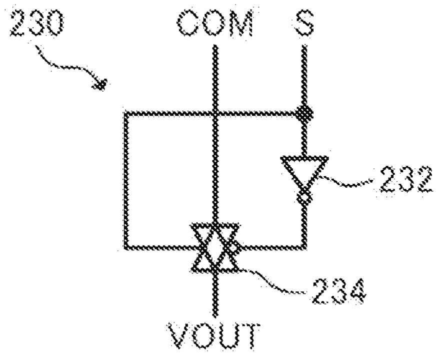
FIG. 7 is a table illustrating an example of a decoding content in a decoder.
FIG. 8 is a diagram illustrating an example of a configuration of a selection circuit corresponding to one discharge portion.

FIG. 7 is a table illustrating an example of the decoding content in the decoder 216. The decoder 216 outputs a selection signal S at a logic level corresponding to the input print data [SId]. Specifically, when the print data [SId]=[1] is input to the decoder 216, the decoder 216 outputs an H level selection signal S in the cycle T, and when the print data [SId]=[0] is input to the decoder 216, the decoder 216 outputs the L level selection signal S in the cycle T.

The selection signal S output by the decoder 216 is input to the selection circuit 230. The selection circuit 230 is provided corresponding to each of the n discharge portions 600. That is, the drive signal selection circuit 200 includes n selection circuits 230, which is the same number as the n discharge portions 600. FIG. 8 is a diagram illustrating an example of a configuration of the selection circuit 230 corresponding to one discharge portion 600. As illustrated in FIG. 8, the selection circuit 230 includes an inverter 232 which is NOT circuit and a transfer gate 234.

The selection signal S is input to a positive control terminal not marked with a circle in the transfer gate 234, and is also input to the negative control terminal marked with a circle in the transfer gate 234 after the logic level is inverted by the inverter 232. In addition, the drive signal COM is supplied to the input terminal of the transfer gate 234. When the H level selection signal S is input, the transfer gate 234 is conductive between the input terminal and the output terminal, and when the L level selection signal S is input, the transfer gate 234 is non-conductive between the input terminal and the output terminal. That is, when the logic level of the input selection signal S is H level, the transfer gate 234 outputs the trapezoidal waveform Adp from the output terminal, and when the logic level of the input selection signal S is L level, the transfer gate 234 does not output the trapezoidal waveform Adp from the output terminal. The signal output to the output terminal of the transfer gate 234 included in the selection circuit 230 is output from the drive signal selection circuit 200 as the drive signal VOUT.

Figure 9:
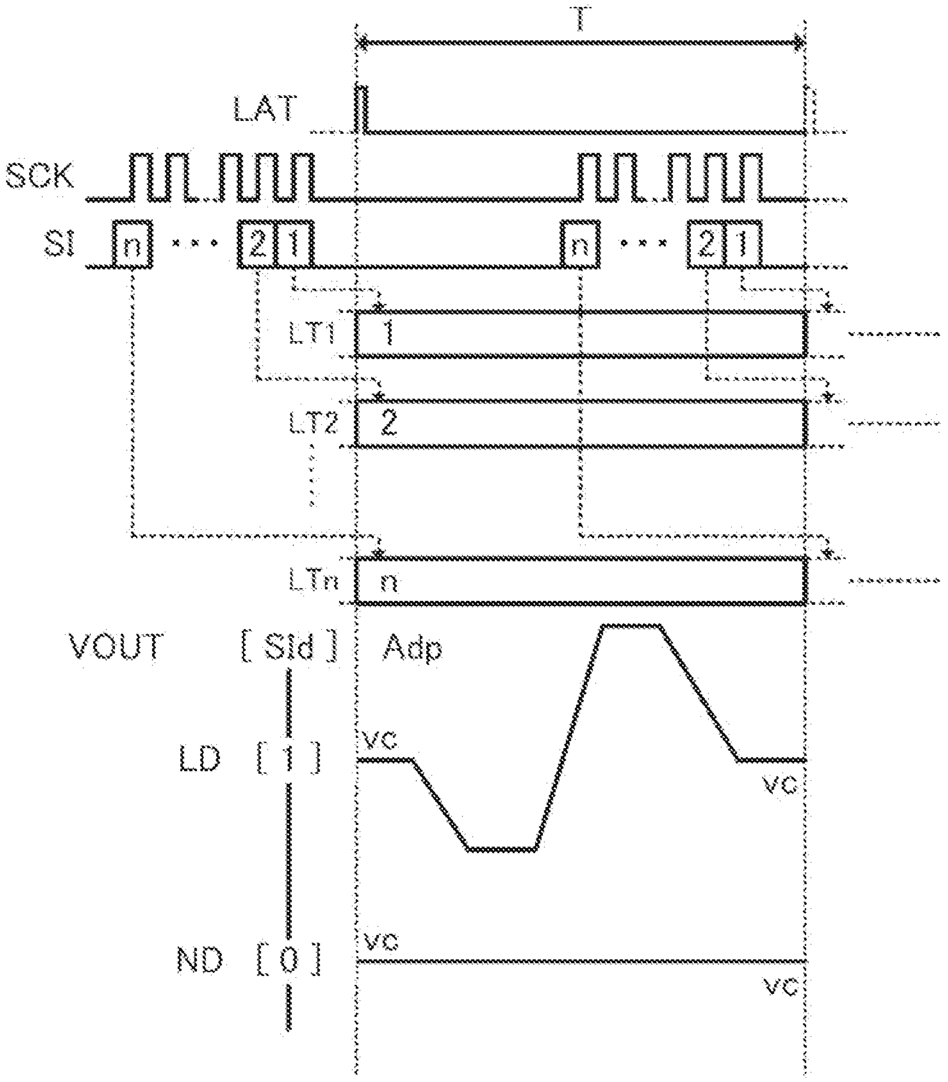
FIG. 9 is a diagram for describing an operation of the drive signal selection circuit.

Here, the operation of the drive signal selection circuit 200 will be described with reference to FIG. 9. FIG. 9 is a diagram for describing the operation of the drive signal selection circuit 200. The print data signal SI is input to the selection control circuit 210 as a serial signal synchronized with the clock signal SCK. The print data signal SI is sequentially transferred in the n shift registers 212 corresponding to the n discharge portions 600 in synchronization with the clock signal SCK. Thereafter, when the input of the clock signal SCK is stopped, the print data [SId] corresponding to each of the n discharge portions 600 is held in the shift register 212. The print data signal SI includes the print data [SId] in the order corresponding to the discharge portions 600 of the nth stage, . . . , the second stage, and the first stage of the shift register 212.

When the latch signal LAT rises, each of the latch circuits 214 latches simultaneously the print data [SId] held in the shift register 212. The print data [SId] latched by the latch circuit 214 is input to the corresponding decoder 216. The LT1, LT2, . . . , LTn illustrated in FIG. 9 correspond to the print data [SId] latched by the latch circuit 214 corresponding to the shift register 212 of the first stage, the second stage, . . . , and the nth stage.

The decoder 216 generates the selection signal S at the logic level illustrated in FIG. 7 by decoding the input print data [SId] and outputs the selection signal S to the corresponding selection circuit 230. The selection circuit 230 selects or does not select the trapezoidal waveform Adp included in the drive signal COM according to the logic level of the selection signal S output by the decoder 216, so that the selection circuit 230 generates a drive signal VOUT corresponding to each of the n discharge portions 600 and outputs the drive signal VOUT to the corresponding discharge portion 600.

Specifically, when the print data [SId]=[1] is input to the decoder 216, the decoder 216 outputs the H level selection signal S in the cycle T. As a result, the selection circuit 230 selects and outputs the trapezoidal waveform Adp in the cycle T. That is, the drive signal selection circuit 200 supplies the drive signal VOUT corresponding to the “discharge FD” to the piezoelectric element 60 of the discharge portion 600. As a result, an amount of ink corresponding to the drive signal VOUT is discharged from the corresponding discharge portion 600. The ink discharged from the discharge portion 600 lands on the medium P, so that dots are formed on the medium P.

On the other hand, when the print data [SId]=[0] is input to the decoder 216, the decoder 216 outputs the L level selection signal S in the cycle T. As a result, the selection circuit 230 does not select the trapezoidal waveform Adp in the cycle T. At this time, the electrode 611 of the piezoelectric element 60 corresponding to the selection circuit 230 holds the voltage vc due to the capacitance component of the piezoelectric element 60. That is, the drive signal selection circuit 200 supplies the voltage vc held immediately before due to the capacitance component of the corresponding piezoelectric element 60 to the piezoelectric element 60 as the drive signal VOUT corresponding to the “non-discharge ND”. As a result, the ink is not discharged from the corresponding discharge portion 600, and thus no dots are formed on the medium P.

As described above, the drive signal selection circuit 200 switches the supply of the drive signal COM to the plurality of piezoelectric elements 60 based on the print data signal SI. In other words, the liquid discharge apparatus 1 is provided with a drive signal selection circuit 200 that switches supply of the drive signal VOUT based on the drive signal COM to the plurality of piezoelectric elements 60 based on the print data signal SI.

1.4. Configuration and Operation of Drive Circuit

Figure 10A:
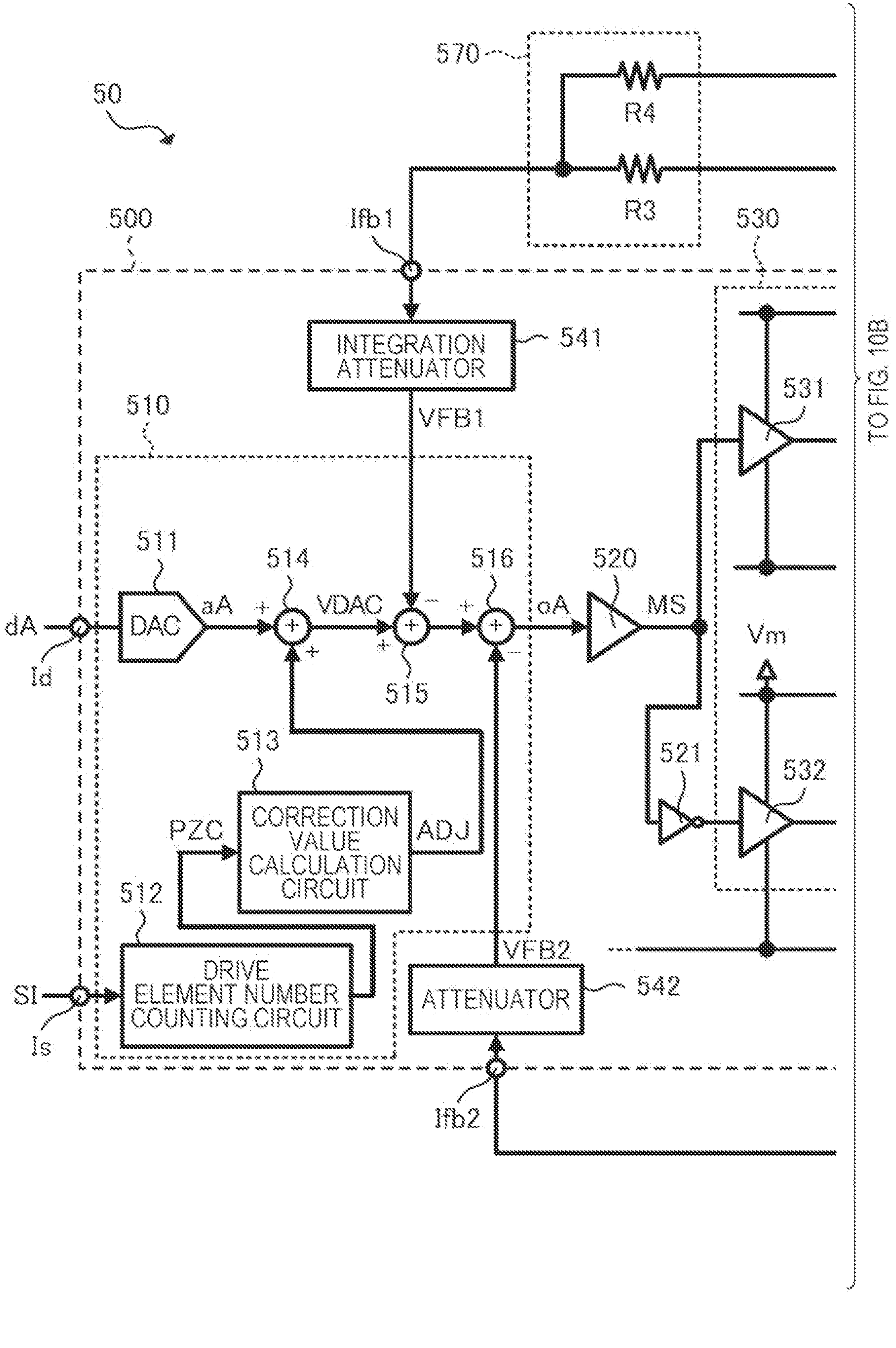
FIGS. 10A and 10B are diagrams illustrating an example of a configuration of a drive circuit.
Figure 10B:
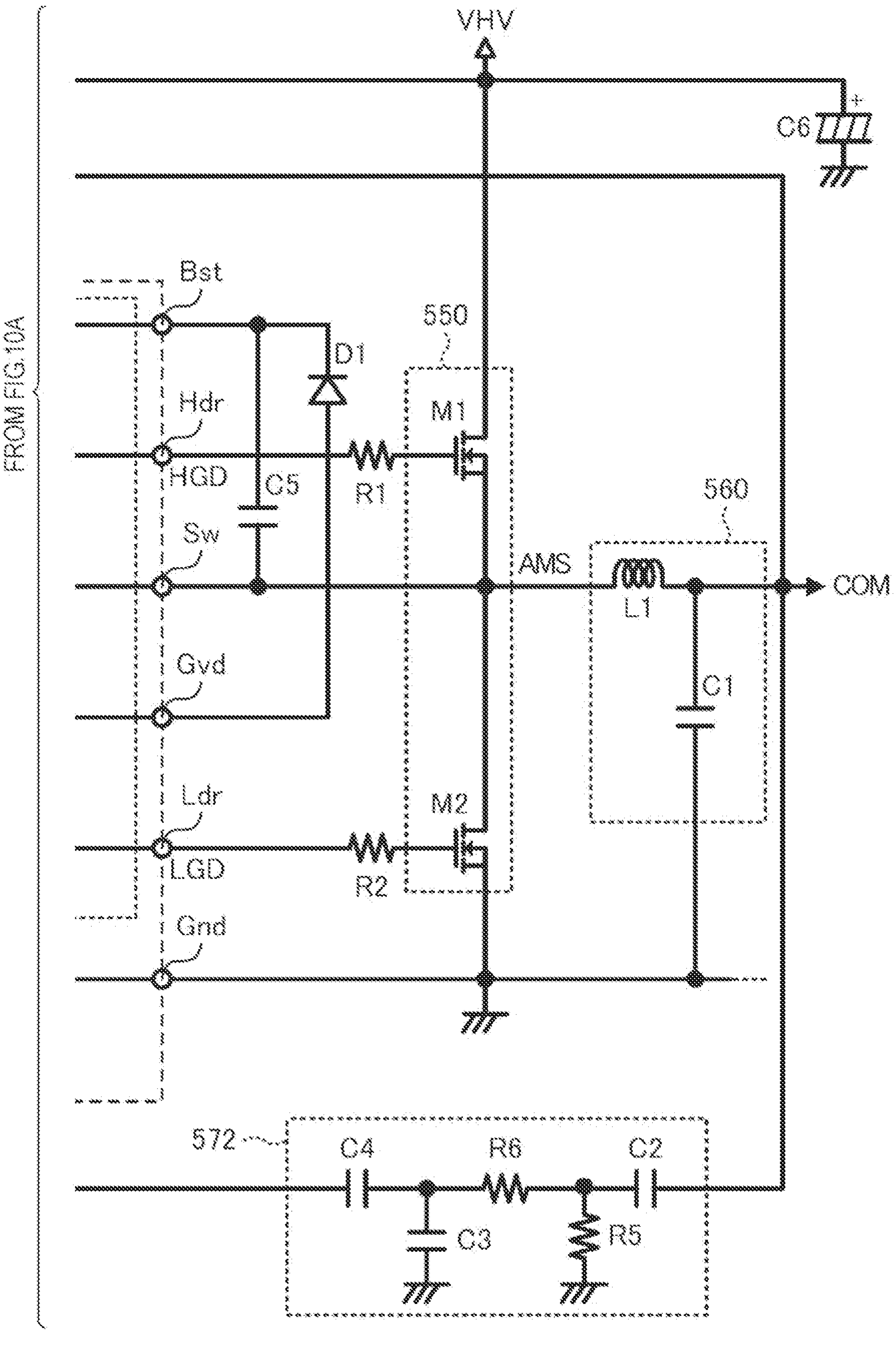

Next, the configuration and operation of the drive circuit 50 that outputs the drive signal COM will be described. FIGS. 10A and 10B are diagrams illustrating an example of the configuration of the drive circuit 50.

As illustrated in FIGS. 10A and 10B, the drive circuit 50 includes an integrated circuit 500, an amplification circuit 550, a demodulation circuit 560, a first feedback circuit 570, and a second feedback circuit 572.

The integrated circuit 500 includes a plurality of terminals including a terminal Id, a terminal Is, a terminal Ifb1, a terminal Ifb2, a terminal Bst, a terminal Hdr, a terminal Sw, a terminal Gvd, a terminal Ldr, and a terminal Gnd. In addition, the integrated circuit 500 includes a base drive signal correction circuit 510, a modulation circuit 520, and a gate drive circuit 530. A part or all of the base drive signal correction circuit 510, the modulation circuit 520, and the gate drive circuit 530 included in the integrated circuit 500 may be provided outside the integrated circuit 500, or configurations other than the base drive signal correction circuit 510, the modulation circuit 520, and the gate drive circuit 530 may be included in the integrated circuit 500.

The base drive signal correction circuit 510 includes a digital to analog converter (DAC) 511, a drive element number counting circuit 512, a correction value calculation circuit 513, and adders 514, 515, and 516. The base drive signal correction circuit 510 outputs a correction base drive signal oA obtained by correcting the base drive signal dA according to the number of piezoelectric elements 60 driven by the drive signal VOUT based on the drive signal COM among the plurality of piezoelectric elements 60.

The base drive signal dA, which is a digital signal defining the waveform of the drive signal COM, is input to the DAC 511. The DAC 511 converts the input base drive signal dA into a base drive signal aA which is an analog signal and outputs the base drive signal aA.

The print data signal SI is input to the drive element number counting circuit 512. The drive element number counting circuit 512 calculates the number of piezoelectric elements 60 driven by the drive signal VOUT based on the drive signal COM in the cycle T based on the input print data signal SI. The drive element number counting circuit 512 generates and outputs a drive element number signal PZC indicating the calculation result.

The drive element number signal PZC is input to the correction value calculation circuit 513. The correction value calculation circuit 513 calculates the correction value of the base drive signal aA based on the base drive signal dA based on the input drive element number signal PZC. The correction value calculation circuit 513 outputs a correction signal ADJ including the calculated correction value.

The base drive signal aA output by the DAC 511 is input to one of the input terminals on the +side of the adder 514. The correction signal ADJ output by the correction value calculation circuit 513 is input to the other of the input terminals on the +side of the adder 514. That is, the adder 514 adds the correction signal ADJ output by the correction value calculation circuit 513 to the base drive signal aA output by the DAC 511. The adder 514 outputs a DAC correction signal VDAC including the addition result.

The DAC correction signal VDAC output by the adder 514 is input to the input terminal on the +side of the adder 515. In addition, a first feedback signal VFB1 in which the drive signal COM fed back via the terminal Ifb1 is attenuated by an integration attenuator 541 is input to the input terminal on the—side of the adder 515. That is, the adder 514 outputs a signal obtained by subtracting the first feedback signal VFB1 input to the input terminal on the − side from the DAC correction signal VDAC input to the input terminal on the + side. Here, while the maximum value of the voltage amplitude of the base drive signal aA, which is the base of the DAC correction signal VDAC, is approximately 2 V, the maximum voltage value of the drive signal COM may be 25 V or higher and may exceed 40 V. The integration attenuator 541 attenuates the voltage of the drive signal COM input via the terminal Ifb1 in order to match the amplitude ranges of both voltages in obtaining the deviation.

The output signal of the adder 515 is input to the input terminal on the + side of the adder 516. A second feedback signal VFB2 in which the high frequency component of the drive signal COM input via the terminal Ifb2 is attenuated by the attenuator 542 is input to the input terminal on the − side of the adder 516. That is, the adder 516 outputs a signal obtained by subtracting the second feedback signal VFB2 input to the input terminal on the − side from the output signal of the adder 515 input to the input terminal on the + side. The output signal of the adder 516 is output from the base drive signal correction circuit 510 as the correction base drive signal oA. That is, the base drive signal correction circuit 510 outputs the correction base drive signal oA obtained by correcting the base drive signals dA and aA which are the bases of the drive signal COM.

The correction base drive signal oA output by the base drive signal correction circuit 510 is input to the modulation circuit 520. The modulation circuit 520 includes, for example, a comparator. The modulation circuit 520 outputs a modulation signal MS obtained by pulse-modulating the correction base drive signal oA. Specifically, the modulation circuit 520 compares the voltage value of the correction base drive signal oA with the voltage vref which is a predetermined reference voltage. The modulation circuit 520 generates and outputs the modulation signal MS that is H level when the voltage value of the correction base drive signal oA is higher than the voltage vref, and is L level when the voltage value of the correction base drive signal oA is lower than the voltage vref.

The modulation signal MS output by the modulation circuit 520 is supplied to the gate driver 531 included in the gate drive circuit 530. In addition, the modulation signal MS output by the modulation circuit 520 is also supplied to the gate driver 532 included in the gate drive circuit 530 after the logic level is inverted by the inverter 521. That is, signals having a mutually exclusive relation of logic levels are input to the gate driver 531 and the gate driver 532.

Here, the fact that signals having a mutually exclusive relation of logic levels are input to the gate driver 531 and the gate driver 532 means that the logic level of the signal supplied to the gate driver 531 and the logic level of the signal supplied to the gate driver 532 need not be simultaneously H level. Therefore, for example, a timing at which the logic level of the signal supplied to the gate driver 531 is the H level and a timing at which the logic level of the signal supplied to the gate driver 532 is the H level may be controlled by a timing circuit (not illustrated).

The gate drive circuit 530 includes the gate driver 531 and the gate driver 532.

The gate driver 531 outputs an amplification control signal HGD obtained by level-shifting the modulation signal MS output by the modulation circuit 520 from the terminal Hdr. Of the power supply voltages supplied to the gate driver 531, the higher side is supplied via the terminal Bst, and the lower side is supplied via the terminal Sw. The terminal Bst is coupled to one end of a capacitor C5 and the cathode of the diode D1 for preventing backflow. The terminal Sw is coupled to the other end of the capacitor C5. In addition, a voltage vm supplied from a power supply circuit (not illustrated) is supplied to the anode of the diode D1 via the terminal Gvd. Therefore, the potential difference between the terminal Bst and the terminal Sw is the potential difference between both ends of the capacitor C5 and is substantially equal to the voltage vm. That is, the gate driver 531 generates an amplification control signal HGD having a voltage value higher than the voltage value of the terminal Sw by a voltage vm according to the input modulation signal MS, and outputs the amplification control signal HGD from the terminal Hdr.

The gate driver 532 operates on the lower potential side than the gate driver 531. The gate driver 532 outputs the amplification control signal LGD obtained by level-shifting a signal obtained by inverting the logic level of the modulation signal MS output by the modulation circuit 520 by the inverter 521 from the terminal Ldr. The voltage vm is supplied to the higher side of the power supply voltage of the gate driver 532, and the ground potential of, for example, 0 V is supplied to the lower side via the terminal Gnd. As a result, the gate driver 532 generates an amplification control signal LGD having a voltage value higher than the voltage value of the terminal Gnd by a voltage vm according to the signal in which the logic level of the input modulation signal MS is inverted, and outputs the amplification control signal LGD from the terminal Ldr.

The amplification circuit 550 includes the transistor M1 and the transistor M2.

The voltage signal VHV is supplied to a drain of the transistor M1. The gate of the transistor M1 is electrically coupled to one end of a resistor R1 and the other end of the resistor R1 is electrically coupled to the terminal Hdr of the integrated circuit 500. That is, the amplification control signal HGD is supplied to the gate of the transistor M1. In addition, the source of the transistor M1 is electrically coupled to the terminal Sw of the integrated circuit 500.

A drain of the transistor M2 is electrically coupled to the terminal Sw of the integrated circuit 500. That is, the drain of the transistor M2 and the source of the transistor M1 are electrically coupled to each other. The gate of the transistor M2 is electrically coupled to one end of the resistor R2, and the other end of the resistor R2 is electrically coupled to the terminal Ldr of the integrated circuit 500. That is, the amplification control signal LGD is supplied to the gate of the transistor M2. In addition, a ground potential is supplied to the source of the transistor M2.

In the amplification circuit 550 configured as described above, when the drain and the source of the transistor M1 are controlled to be non-conductive and the drain and the source of the transistor M2 are controlled to be conductive, the voltage value of the node electrically coupled to the terminal Sw is the ground potential. Therefore, the voltage vm is supplied to the terminal Bst. On the other hand, when the drain and the source of the transistor M1 are controlled to be conductive and the drain and the source of the transistor M2 are controlled to be non-conductive, the voltage value of the node to which the terminal Sw is electrically coupled is the voltage vhv, which is the voltage value of the voltage signal VHV. Therefore, a signal having a voltage value of voltage vhv+voltage vm is supplied to the terminal Bst. That is, the gate driver 531 that drives the transistor M1 generates an amplification control signal HGD in which the L level is from the ground potential to the voltage vhv and in which the H level is from the voltage vhv to the voltage vhv+the voltage vm, by changing the voltage value of the terminal Sw to the ground potential or the voltage vhv according to the operation of the transistor M1 and the transistor M2 using the capacitor C5 as a floating power source, and supplies the amplification control signal HGD to the gate of the transistor M1.

On the other hand, the gate driver 532 that drives the transistor M2 generates an amplification control signal LGD in which the L level is the ground potential and in which the H level is the voltage vm regardless of the operation of the transistor M1 and the transistor M2, and supplies the amplification control signal LGD to the gate of the transistor M2.

The amplification circuit 550 as described above amplifies the modulation signal MS in which the correction base drive signal oA is modulated by the transistor M1 and the transistor M2 based on the voltage signal VHV. As a result, the amplified modulation signal AMS in which the modulation signal MS is amplified based on the voltage signal VHV is generated at a coupling point to which the source of the transistor M1 and the drain of the transistor M2 are commonly coupled. That is, the amplification circuit 550 outputs the amplified modulation signal AMS obtained by amplifying the modulation signal MS.

The amplified modulation signal AMS output by the amplification circuit 550 is input to the demodulation circuit 560. The demodulation circuit 560 generates a drive signal COM by demodulating the amplified modulation signal AMS output by the amplification circuit 550, and outputs the drive signal COM from the drive circuit 50.

The demodulation circuit 560 includes an inductor L1 and a capacitor C1. One end of the inductor L1 is coupled to one end of the capacitor C1. In addition, the amplified modulation signal AMS is input to the other end of the inductor L1. A ground potential is supplied to the other end of the capacitor C1. That is, the inductor L1 and the capacitor C1 included in the demodulation circuit 560 form a low-pass filter. The demodulation circuit 560 demodulates the amplified modulation signal AMS by smoothing the amplified modulation signal AMS with the low-pass filter. The demodulation circuit 560 outputs the demodulated signal as the drive signal COM. That is, the demodulation circuit 560 includes the capacitor C1 and outputs the drive signal COM by demodulating the amplified modulation signal AMS.

The first feedback circuit 570 and the second feedback circuit 572 feed back the drive signal COM to the base drive signal correction circuit 510.

The first feedback circuit 570 includes a resistor R3 and a resistor R4. The drive signal COM is supplied to one end of the resistor R3. The other end of the resistor R3 is coupled to one end of the terminal Ifb1 and the resistor R4. The voltage signal VHV is supplied to the other end of the resistor R4. As a result, the first feedback signal VFB1 in which the drive signal COM passed through the first feedback circuit 570 and the terminal Ifb1 is pulled up by the voltage signal VHV is fed back to the base drive signal correction circuit 510.

The second feedback circuit 572 includes capacitors C2, C3, and C4 and resistors R5 and R6. The drive signal COM is supplied to one end of the capacitor C2. The other end of the capacitor C2 is coupled to one end of the resistor R5 and one end of the resistor R6. The ground potential is supplied to the other end of the resistor R5. As a result, the capacitor C2 and the resistor R5 function as high-pass filters. In other words, the second feedback circuit 572 includes a high-pass filter. The high-pass filter removes a low-frequency component of the drive signal COM input to the second feedback circuit 572. As a result, a triangular wave-shaped signal caused by the ripple component superimposed on the drive signal COM is extracted. Here, the triangular wave-shaped signal means that a signal that does not strictly become a triangular wave is included according to the frequency characteristic of the second feedback circuit 572. In the following description, the signal extracted by the second feedback circuit 572 will be described as a triangular wave.

In addition, the other end of the resistor R6 is coupled to one end of the capacitor C4 and one end of the capacitor C3. The ground potential is supplied to the other end of the capacitor C3. As a result, in the second feedback circuit 572, the resistor R6 and the capacitor C3 function as a low-pass filter. That is, the second feedback circuit 572 includes a low-pass filter. The cut-off frequency of the low-pass filter is set to be sufficiently higher than the cut-off frequency of the high-pass filter including the capacitor C2 and the resistor R5. As a result, the low-pass filter configured to include the resistor R6 and the capacitor C3 removes the high-frequency noise component superimposed on the output of the high-pass filter configured to include the capacitor C2 and the resistor R5.

The second feedback circuit 572 configured as described above functions as a band pass filter through which a signal in a predetermined frequency range included in the drive signal COM is passed. The other end of the capacitor C4 is coupled to the terminal Ifb2 of the integrated circuit 500. As a result, a triangular wave signal obtained by extracting the high frequency component included in the drive signal COM, specifically, a triangular wave signal corresponding to the cycle of the ripple voltage superimposed on the drive signal COM according to the amplified modulation signal AMS, is fed back to the base drive signal correction circuit 510 as a second feedback signal VFB2 by the second feedback circuit 572.

Here, the drive signal COM output by the drive circuit 50 is a signal obtained by smoothing the amplified modulation signal AMS by a low-pass filter included in the demodulation circuit 560. The drive signal COM output by such a drive circuit 50 is integrated and subtracted via the terminal Ifb1 and then fed back to the adder 515, so that the drive circuit 50 performs self-excited oscillation at a frequency determined by the delay of the first feedback circuit 570 and the feedback transfer function. However, the amount of delay is large in the feedback path via the terminal Ifb1, and thus the frequency of the self-excited oscillation of the drive circuit 50 may not be increased to such an extent that the accuracy of the drive signal COM can be sufficiently ensured. Therefore, in the drive circuit 50 of the present embodiment, in addition to the feedback path via the first feedback circuit 570, a feedback path via the second feedback circuit 572 is provided to feed back the high frequency component of the drive signal COM, so that the delay when viewed in the entire circuit is reduced. As a result, the frequency of the correction base drive signal oA can be increased to such an extent that the accuracy of the drive signal COM can be sufficiently ensured.

Here, when the voltage value of the drive signal COM output by the drive circuit 50 at a predetermined timing is defined as a voltage vcom, the voltage vcom can be expressed by the following equation (1) from the on-duty AMon of the amplified modulation signal AMS and the voltage vhv, which is the voltage value of voltage signal VHV.

$$vcom=AMon\times v/v \qquad (1)$$

In view of the fact that the signal obtained by amplifying the modulation signal MS by the amplification circuit 550 is the amplified modulation signal AMS, the on-duty AMon of the amplified modulation signal AMS and the on-duty Mon of the modulation signal MS are substantially equal to each other, and the on-duty AMon of the above equation (1) can be replaced with the on-duty Mon of the modulation signal MS. Therefore, the voltage vcom, which is a voltage value at a predetermined timing of the drive signal COM output by the drive circuit 50, can be expressed as the following equation (2).

$$vcom = Mon \times v/vv \tag{2}$$

That is, the drive circuit 50 outputs the drive signal COM of the voltage value based on the on-duty Mon of the modulation signal MS obtained by modulating the correction base drive signal oA.

Figure 11:
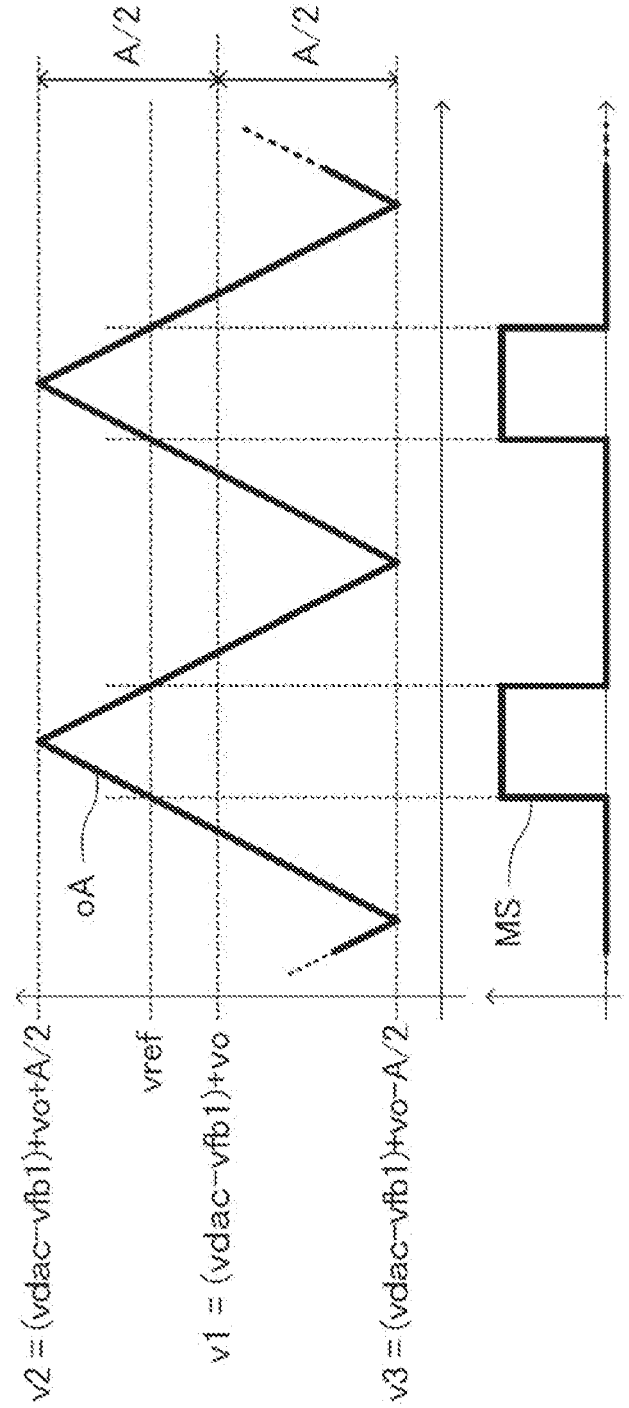
FIG. 11 is a graph for describing a relationship between a correction base drive signal and a modulation signal.

Next, the on-duty Mon of the modulation signal MS will be described. FIG. 11 is a graph for describing the relationship between the correction base drive signal oA and the modulation signal MS. As described above, the correction base drive signal oA output by the base drive signal correction circuit 510 is a signal obtained by subtracting the first feedback signal VFB1 and the second feedback signal VFB2 from the DAC correction signal VDAC, and the second feedback signal VFB2 input to the base drive signal correction circuit 510 is a triangular wave signal based on the cycle of the ripple voltage superimposed on the drive signal COM according to the frequency of the amplified modulation signal AMS.

Therefore, when the voltage value of the DAC correction signal VDAC is the voltage vdac, the voltage value of the first feedback signal VFB1 is the voltage vfb1, the voltage value of the predetermined offset voltage is voltage vo, and the voltage amplitude of the second feedback signal VFB2 as the triangular wave is amplitude A, the correction base drive signal oA is a triangular wave whose voltage value changes within the range of the following equations (4) to (5) according to the cycle of the ripple voltage superimposed on the drive signal COM with the median value of voltage v1 expressed in the following equation (3).

$$v1 = (vdac - vfb1) + vo \tag{3}$$

$$v2 = (vdac - vfb1) + vo + A/2 \tag{4}$$

$$v3 = (vdac - vfb1) + vo - A/2 \tag{5}$$

Here, the voltage vo expressed in the above equations (3) to (5) is a voltage value of a predetermined offset voltage and corresponds to any voltage value for correcting errors and variations occurring in the drive circuit 50, such as a voltage value of a DC voltage component remaining in the triangular wave as the second feedback signal VFB2 and a voltage value of an offset voltage of the comparator constituting the modulation circuit 520.

The modulation circuit 520 compares the voltage value of the correction base drive signal oA output from the base drive signal correction circuit 510 with the voltage vref as the voltage value of the reference voltage to generate and output the modulation signal MS that is H level when the voltage value of the correction base drive signal oA is higher than the voltage vref, and that is L level when the voltage value of the correction base drive signal oA is lower than the voltage vref.

At this time, the on-duty Mon of the modulation signal MS output by the modulation circuit 520 can be expressed by the following equation (6) from FIG. 11.

$$Mon = \frac{A - \left(\frac{A}{2} + (vref - v1)\right)}{A} \tag{6}$$

By substituting the equation (3) into the above equation (6), the on-duty Mon of the modulation signal MS output by the modulation circuit 520 can be expressed as the following equation (7).

$$Mon = \frac{\frac{A}{2} + (vdac - vfb1 - vref + vo)}{A} \tag{7}$$

In addition, the voltage vfb1, which is a voltage value of the first feedback signal VFB1, is a voltage value obtained by attenuating the voltage vcom, which is a voltage of the drive signal COM, by the first feedback circuit 570 and the integration attenuator 541. Therefore, when the attenuation rate is a by the first feedback circuit 570 and the integration attenuator 541, the voltage vfb1, which is the voltage value of the first feedback signal VFB1, can be expressed by the following equation (8).

$$vfb1 = \alpha \times vcom \tag{8}$$

By substituting the equations (7) and (8) into the above-described equation (2) and rearranging the equations, a voltage vcom which is a voltage value at a predetermined timing of the drive signal COM output by the drive circuit 50 can be expressed as the following equation (9).

$$vcom = \frac{vhv\left(\frac{A}{2} + vdac - (vref - vo)\right)}{A + (\alpha \times vhv)} \tag{9}$$

From the above equation (9), the voltage vcom which is the voltage value of the drive signal COM output by the drive circuit 50 depends on the amplitude A which is the voltage amplitude of the second feedback signal VFB2. Specifically, the amplitude of the drive signal COM is proportional to the voltage vdac and inversely proportional to the denominator of the equation (9). Therefore, the amplitude of the drive signal COM depends on the amplitude A, which is the voltage amplitude of the second feedback signal VFB2.

Here, the second feedback signal VFB2 is a signal that depends on the ripple voltage superimposed on the drive signal COM as described above, and the amplitude A of the second feedback signal VFB2 depends on the voltage amplitude of the ripple voltage superimposed on the drive signal COM. In addition, the voltage amplitude of the ripple voltage superimposed on the drive signal COM depends on the load capacitance generated in a propagation path through which the drive signal COM propagates. That is, when the load capacitance generated in the propagation path through which the drive signal COM propagates changes, the amplitude A of the second feedback signal VFB2 changes, and the value of the voltage vcom, which is the voltage value of the drive signal COM, changes. As a result, the amplitude of the voltage value of the drive signal COM changes according to the load capacitance.

In particular, as in the liquid discharge apparatus 1 of the present embodiment, a plurality of piezoelectric elements 60, which are the capacitive loads, are provided and whether or not to supply the drive signal VOUT based on the drive signal COM individually to the plurality of piezoelectric elements 60 is switched. Therefore, in the liquid discharge apparatus 1 that forms an image on the medium P, the number of piezoelectric elements 60 to which the drive signal VOUT based on the drive signal COM is supplied significantly changes. As a result, the load capacitance generated in the propagation path through which the drive signal COM is propagated significantly changes. That is, in the drive circuit 50 that supplies the drive signal COM to the plurality of piezoelectric elements 60, the amplitude of the voltage value of the drive signal COM changes according to the number of piezoelectric elements 60 to which the drive signal VOUT based on the drive signal COM is supplied.

For example, when the number of piezoelectric elements 60 to which the drive signal VOUT is supplied increases, the amplitude A of the second feedback signal VFB decreases. Therefore, the amplitude of the drive signal COM increases. On the other hand, when the number of piezoelectric elements 60 to which the drive signal VOUT is supplied decreases, the amplitude A of the second feedback signal VFB increases. Therefore, the amplitude of the drive signal COM decreases. That is, the amplitude of the drive signal COM may change by changing the number of piezoelectric elements 60 to which the drive signal VOUT is supplied.

To solve the problem, in the liquid discharge apparatus 1 of the present embodiment, the drive element number counting circuit 512 included in the base drive signal correction circuit 510 of the drive circuit 50 calculates the number of piezoelectric elements 60 driven by the drive signal VOUT based on the drive signal COM based on the print data signal SI, and the correction value calculation circuit 513 calculates a correction value corresponding to the number of piezoelectric elements 60 driven by the drive signal VOUT based on the drive signal COM based on the calculation result of the drive element number counting circuit 512. The base drive signal aA based on the base drive signal dA is corrected based on the correction signal ADJ including the correction value calculated by the correction value calculation circuit 513. As a result, in the drive circuit 50 that supplies the drive signal COM to the plurality of piezoelectric elements 60, even when the number of piezoelectric elements 60 to which the drive signal VOUT based on the drive signal COM is supplied changes, the possibility that the amplitude of the voltage value of the drive signal COM changes is reduced.

Figure 12:
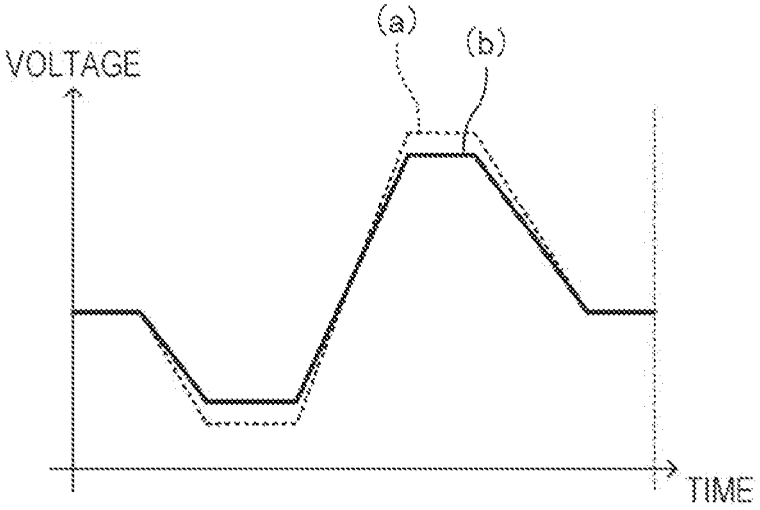
FIG. 12 is a graph illustrating an example of a DAC correction signal when the number of piezoelectric elements driven by the drive signal is large.

Here, a specific example of the DAC correction signal VDAC obtained by correcting the base drive signal aA by the correction signal ADJ will be described. FIG. 12 is a graph illustrating an example of a DAC correction signal VDAC when the number of piezoelectric elements 60 driven by the drive signal VOUT is large. In FIG. 12, the base drive signal aA which is not corrected is illustrated by a broken line (a), and the DAC correction signal VDAC obtained by correcting the base drive signal aA with the correction signal ADJ including the correction value calculated by the correction value calculation circuit 513 illustrated by a solid line (b). As illustrated in FIG. 12, when the number of piezoelectric elements 60 driven by the drive signal VOUT based on the drive signal COM based on the print data signal SI is large, the DAC correction signal VDAC is corrected based on the correction signal ADJ including the correction value calculated by the correction value calculation circuit 513 such that the amplitude of the base drive signal aA based on the base drive signal dA is reduced. As a result, the possibility that the amplitude of the voltage value of the drive signal COM changes is reduced.

Figure 13:
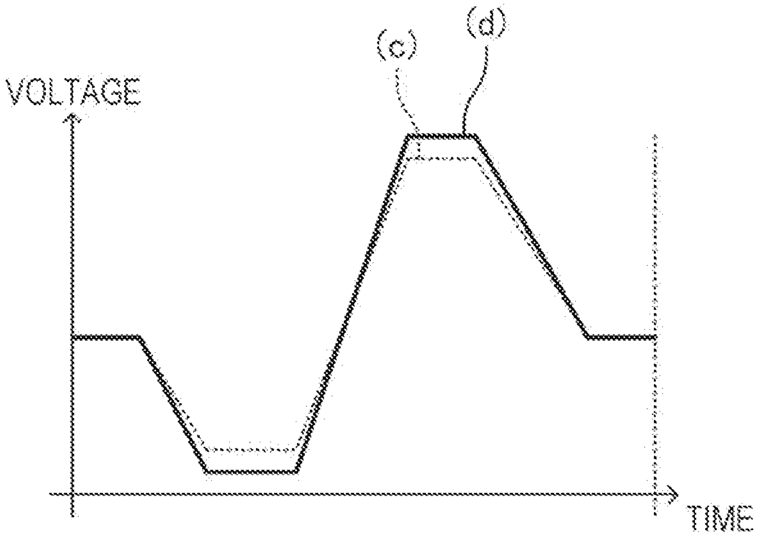
FIG. 13 is a graph illustrating an example of a DAC correction signal when the number of piezoelectric elements driven by the drive signal is small.

FIG. 13 is a graph illustrating an example of a DAC correction signal VDAC when the number of piezoelectric elements 60 driven by the drive signal VOUT is small. In FIG. 13, the base drive signal aA which is not corrected is illustrated by a broken line (c), and the DAC correction signal VDAC obtained by correcting the base drive signal aA with the correction signal ADJ including the correction value calculated by the correction value calculation circuit 513 illustrated by a solid line (d). As illustrated in FIG. 13, when the number of piezoelectric elements 60 driven by the drive signal VOUT based on the drive signal COM based on the print data signal SI is small, the DAC correction signal VDAC is corrected based on the correction signal ADJ including the correction value calculated by the correction value calculation circuit 513 such that the amplitude of the base drive signal aA based on the base drive signal dA increases. As a result, the possibility that the amplitude of the voltage value of the drive signal COM changes is reduced.

As described above, in the liquid discharge apparatus 1 of the present embodiment, the base drive signal correction circuit 510 included in the drive circuit 50 outputs a correction base drive signal oA obtained by correcting the base drive signal dA according to the number of piezoelectric elements 60 driven by the drive signal VOUT based on the drive signal COM. As a result, the possibility that the amplitude of the voltage value of the drive signal COM output by the drive circuit 50 changes with the change in the load capacitance is reduced.

Next, an example of a method of calculating the number of piezoelectric elements 60 driven by the drive signal VOUT based on the drive signal COM executed by the base drive signal correction circuit 510 will be described.

As described above, whether or not the drive signal VOUT based on the drive signal COM is supplied to the plurality of piezoelectric elements 60 included in the liquid discharge head 21 is controlled by the drive signal selection circuit 200.

Specifically, the drive signal selection circuit 200 supplies the drive signal VOUT corresponding to the discharge FD and based on the drive signal COM to the piezoelectric element 60 included in discharge portion 600 corresponding to input print data [SId]=[1], and supplies the drive signal VOUT corresponding to the non-discharge ND and having a voltage value held in the piezoelectric element 60 to the piezoelectric element 60 included in discharge portion 600 corresponding to input print data [SId]=[0]. That is, the drive signal VOUT based on the drive signal COM is supplied to the piezoelectric element 60 included in the discharge portion 600 corresponding to the print data [SId]=[1].

Therefore, in the base drive signal correction circuit 510, the drive element number counting circuit 512 calculates the total number of piezoelectric elements 60 to which the drive signal VOUT based on the drive signal COM is supplied by calculating the total number of print data [SId]=[1] included in the print data signal SI, and the correction value calculation circuit 513 calculates a correction value based on the total number of piezoelectric elements 60 to which the drive signal VOUT based on the drive signal COM is supplied. In other words, the base drive signal correction circuit 510 calculates the number of piezoelectric elements 60 driven by supplying the drive signal VOUT based on the drive signal COM among the plurality of piezoelectric elements 60 based on the print data signal SI.

As a method of calculating the total number of print data [SId]=[1] included in the print data signal SI by the drive element number counting circuit 512 included in the base drive signal correction circuit 510, a method of sequentially adding the print data [SId]=[1] included in the print data signal SI can be considered. However, in view of the fact that the liquid discharge apparatus 1 has hundreds to thousands of nozzles, in order to sequentially add the print data [SId]=[1] included in the print data signal SI by the drive element number counting circuit 512, there is a possibility that the calculation load increases, the time required for arithmetic processing increases, and the discharge speed of the ink on the medium P decreases.

Therefore, the drive element number counting circuit 512 in the present embodiment first calculates 2-bit addition data by adding the print data [SId] propagated adjacent to each other among the n print data [SId] serially included in the print data signal SI, and then, calculates 4-bit addition data by adding the 2-bit addition data adjacent to each other. The drive element number counting circuit 512 calculates the n-bit addition data by repeating the same calculation processing. As a result, when calculating the total number of print data [SId]=[1] included in the print data signal SI, the calculation load generated in the drive element number counting circuit 512 can be reduced, and the time required for arithmetic processing in the drive element number counting circuit 512 can also be shortened.

Figure 14:
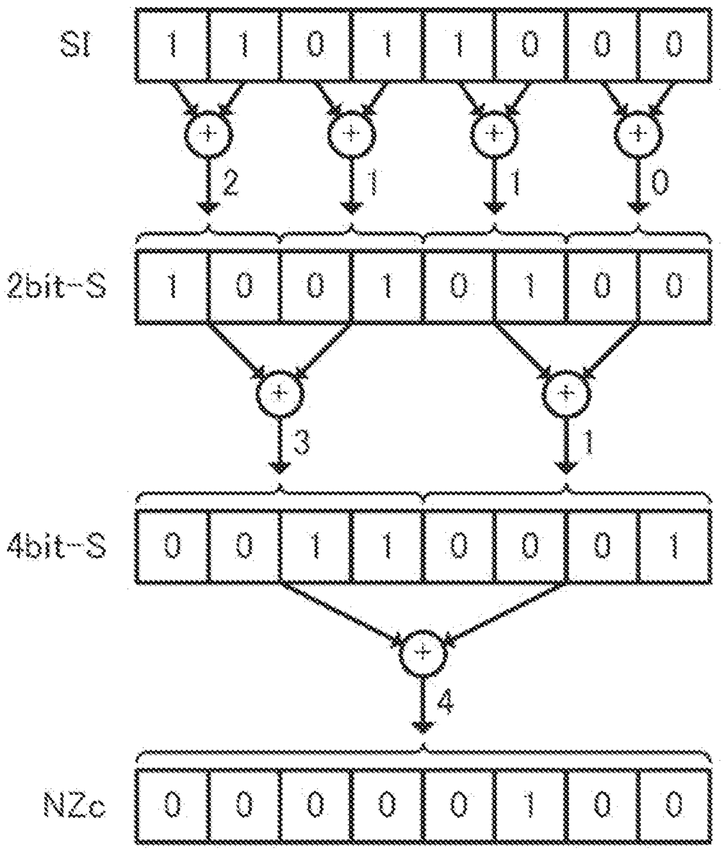
FIG. 14 is a diagram illustrating a specific example of a calculation method of the total number of piezoelectric elements driven by the drive signal based on the drive signal.

A specific example of the calculation method in the drive element number counting circuit 512 as described above will be described. FIG. 14 is a diagram illustrating a specific example of the calculation method of the total number of piezoelectric elements 60 driven by the drive signal VOUT based on the drive signal COM. FIG. 14 illustrates when an 8-bit print data signal SI is input to the drive element number counting circuit 512 for simplification of the description.

As illustrated in FIG. 14, when an 8-bit print data signal SI=[1, 1, 0, 1, 1, 0, 0, 0] is input to the drive element number counting circuit 512 as an example of the print data signal SI, the drive element number counting circuit 512 adds 1 bits adjacent to each other in the input print data signal SI=[1, 1, 0, 1, 1, 0, 0, 0]. As a result, the drive element number counting circuit 512 calculates the 2-bit addition data.

Specifically, the drive element number counting circuit 512 calculates the logical product of the print data signals SI=[1, 1, 0, 1, 1, 0, 0, 0] and S1=[0, 1, 0, 1, 0, 1, 0, 1], and also calculates the logical product of the calculation result obtained by shifting the print data signal SI=[1, 1, 0, 1, 1, 0, 0, 0] to the right by 1 bit and S1=[0, 1, 0, 1, 0, 1, 0, 1]. The drive element number counting circuit 512 adds a calculation result of the logical product of the calculation result obtained by shifting the print data signal SI=[1, 1, 0, 1, 1, 0, 0, 0] to the right by 1 bit and S1=[0, 1, 0, 1, 0, 1, 0, 1] to the calculation result of the logical product of the print data signal SI=[1, 1, 0, 1, 1, 0, 0, 0] and S1=[0, 1, 0, 1, 0, 1, 0, 1]. As a result, the drive element number counting circuit 512 calculates 2-bit addition data 2 bit−S=[1, 0, 0, 1, 0, 1, 0, 0] by adding 1-bit data adjacent to each other in the print data signal SI=[1, 1, 0, 1, 1, 0, 0, 0].

Thereafter, the drive element number counting circuit 512 calculates the logical product of the 2-bit addition data 2 bit−S=[1, 0, 0, 1, 0, 1, 0, 0] and S2=[0, 0, 1, 1, 0, 0, 1, 1], and also calculates the logical product of the calculation result obtained by shifting the 2-bit addition data 2 bit−S=[1, 0, 0, 1, 0, 1, 0, 0] to the right by 2 bits and S2=[0, 0, 1, 1, 0, 0, 1, 1]. The drive element number counting circuit 512 adds a calculation result of the logical product of the calculation result obtained by shifting the 2-bit addition data 2 bit−S=[1, 0, 0, 1, 0, 1, 0, 0] to the right by 2 bits and S2=[0, 0, 1, 1, 0, 0, 1, 1] to the calculation result of the logical product of the 2-bit addition data 2 bit−S=[1, 0, 0, 1, 0, 1, 0, 0] and S2=[0, 0, 1, 1, 0, 0, 1, 1]. As a result, the drive element number counting circuit 512 calculates 4-bit addition data 4 bit−S=[0, 0, 1, 1, 0, 0, 0, 1] by adding 2-bit data adjacent to each other in the 2-bit addition data 2 bit−S=[1, 0, 0, 1, 0, 1, 0, 0].

Thereafter, the drive element number counting circuit 512 calculates the logical product of the 4-bit addition data Obit−S=[0, 0, 1, 1, 0, 0, 0, 1] and S4=[0, 0, 0, 0, 1, 1, 1, 1], and also calculates the logical product of the calculation result obtained by shifting the 4-bit addition data 4 bit−S=[0, 0, 1, 1, 0, 0, 0, 1] to the right by 4 bits and S4=[0, 0, 0, 0, 1, 1, 1, 1]. The drive element number counting circuit 512 adds a calculation result of the logical product of the calculation result obtained by shifting the 4-bit addition data 4 bit−S=[0, 0, 1, 1, 0, 0, 0, 1] to the right by 4 bits and S4=[0, 0, 0, 0, 1, 1, 1, 1] to the calculation result of the logical product of the 4-bit addition data 4 bit−S=[0, 0, 1, 1, 0, 0, 0, 1] and S4=[0, 0, 0, 0, 1, 1, 1, 1]. As a result, the drive element number counting circuit 512 calculates 8-bit addition data 8 bit−S=[0, 0, 0, 0, 0, 1, 0, 0] by adding 4-bit data adjacent to each other in the 4-bit addition data 4 bit−S=[0, 0, 1, 1, 0, 0, 0, 1].

The 8-bit addition data 8 bit−S=[0, 0, 0, 0, 0, 1, 0, 0] calculated by the drive element number counting circuit 512 corresponds to the total number of print data [SId]=[1] included in the 8-bit print data signal SI=[1, 1, 0, 1, 1, 0, 0, 0]. The drive element number counting circuit 512 generates a drive element number signal PZC including the calculated 8-bit addition data 8 bit−S=[0, 0, 0, 0, 0, 1, 0, 0], and outputs the drive element number signal PZC to the correction value calculation circuit 513.

As described above, the drive element number counting circuit 512 calculates the number of piezoelectric elements 60 driven by the drive signal VOUT based on the drive signal COM based on the print data signal SI, and thus, for example, even when the head unit 20 includes 800 piezoelectric elements 60, that is, even when the print data signal SI includes 800-bit print data [SId], the total number of print data [SId]=[1] included in the print data signal SI can be calculated by 29 times of addition and 8 times of logic calculation. Therefore, the possibility that the calculation load in the drive element number counting circuit 512 increases is reduced, and the time required for the arithmetic processing in the drive element number counting circuit 512 can be shortened.

Here, the piezoelectric element 60 is an example of the capacitive load, and the drive circuit 50 that outputs the drive signal COM supplied to the plurality of capacitive loads, which are the plurality of piezoelectric elements 60, is an example of the capacitive load drive circuit. In addition, in view of the fact that the drive signal VOUT is generated based on the drive signal COM, both the drive signal COM and the drive signal VOUT output by the drive circuit 50 are examples of the drive signals. Among the plurality of piezoelectric elements 60, the piezoelectric element 60 to which the drive signal VOUT based on the drive signal COM is supplied is an example of the drive capacitive load. In addition, the drive signal selection circuit 200 that switches the supply of the drive signal VOUT based on the drive signal COM to the plurality of piezoelectric elements 60 is an example of a switching circuit, and the print data signal SI that controls switching of supply of the drive signal VOUT based on the drive signal COM to the plurality of piezoelectric elements 60 in the drive signal selection circuit 200 is an example of discharge data. In addition, the base drive signal aA that is a base of the drive signal COM is an example of the base drive signal, and in view of the fact that the base drive signal aA is a signal obtained by digital-analog converting the digital base drive signal dA, the base drive signal dA is also an example of the base drive signal. In addition, the base drive signal correction circuit 510 that outputs the correction base drive signal oA by correcting the base drive signal aA is an example of the correction circuit. In addition, the capacitor C1 included in the demodulation circuit 560 is an example of the capacitor, and the second feedback circuit 572 is an example of the feedback circuit.

1.5. Action and Effect

As described above, the drive circuit 50 included in the liquid discharge apparatus 1 of the present embodiment corrects the base drive signal aA according to the number of piezoelectric elements 60 supplied with the drive signal VOUT based on the drive signal COM in the base drive signal correction circuit 510. As a result, even when the capacitance component of the propagation path of the drive signal COM changes due to a change in the number of piezoelectric elements 60 to which the drive signal VOUT based on the drive signal COM is supplied, the possibility that the voltage value of the signal waveform of the drive signal COM changes is reduced. That is, the waveform accuracy of the drive signal COM output by the drive circuit 50 is improved, and as a result, the ink discharge accuracy of the liquid discharge apparatus 1 provided with the drive circuit 50 is further improved.

1.6 Modification Example

In the drive circuit 50 included in the liquid discharge apparatus 1 of the present embodiment described above, although it is described that the base drive signal correction circuit 510 generates the correction base drive signal oA by adding the correction signal ADJ based on drive element number signal PZC calculated by the drive element number counting circuit 512 to the analog base drive signal aA output by the DAC 511, the base drive signal correction circuit 510 may generate the base drive signal aA and the correction base drive signal oA by adding a correction value based on the number of drive nozzles calculated by the drive element number counting circuit 512 to the digital base drive signal dA. Even in this case, the same action and effect can be obtained.

2. Second Embodiment

Next, a liquid discharge apparatus 1 according to a second embodiment will be described. In the liquid discharge apparatus 1 of the second embodiment, a configuration of the drive circuit 50 that outputs the drive signal COM is different from that of the liquid discharge apparatus 1 of the first embodiment. In describing the liquid discharge apparatus 1 of the second embodiment, the same reference numerals are given to the same configurations as those of the liquid discharge apparatus 1 of the first embodiment, and the description thereof will be simplified or omitted.

Figure 15:
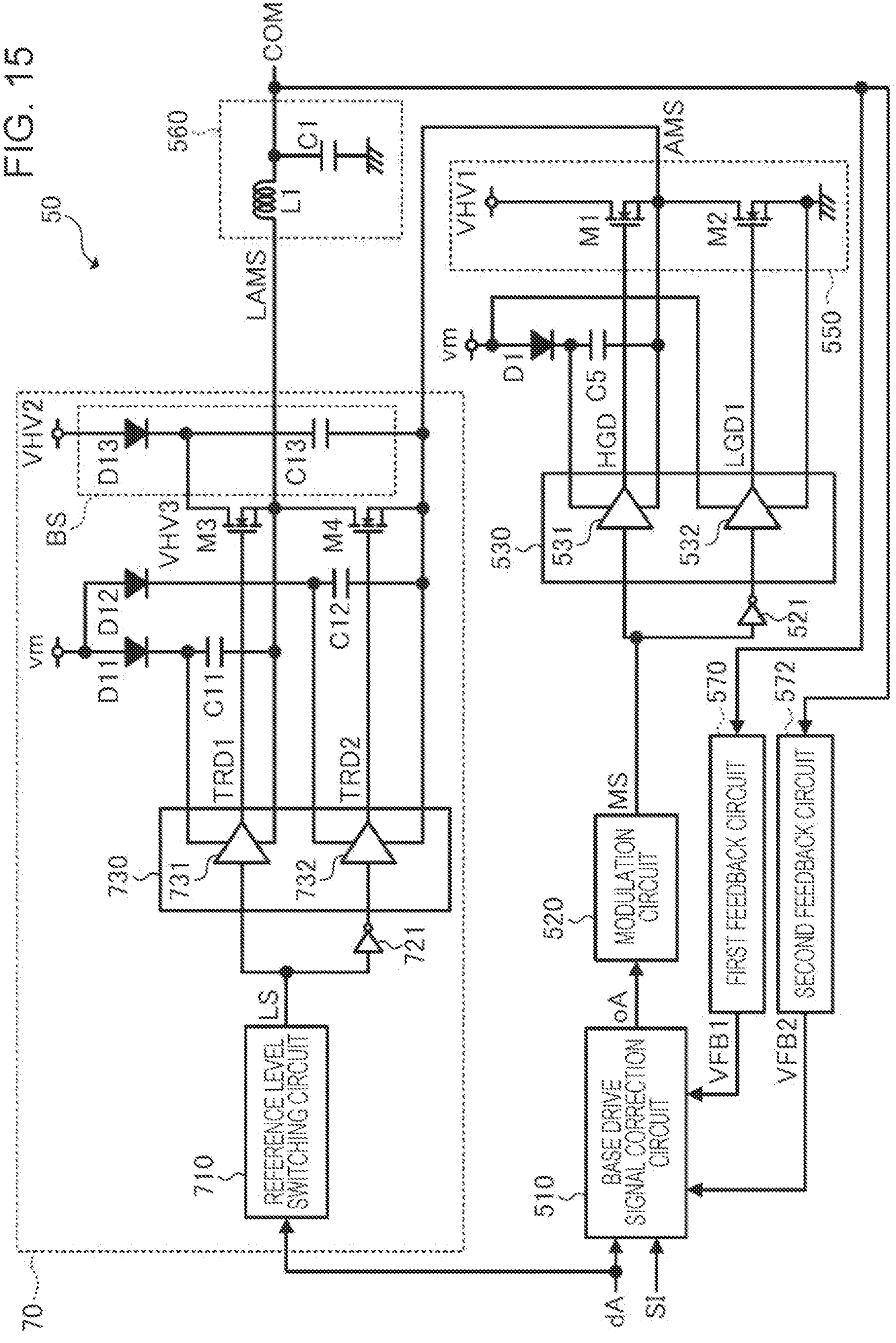
FIG. 15 is a diagram illustrating a configuration of a drive circuit according to a second embodiment.

FIG. 15 is a diagram illustrating a configuration of a drive circuit 50 of a second embodiment. As illustrated in FIG. 15, the drive circuit 50 of the second embodiment includes a level shift circuit 70 in addition to the base drive signal correction circuit 510, the modulation circuit 520, the gate drive circuit 530, the amplification circuit 550, and the demodulation circuit 560.

The base drive signal dA, the print data signal SI, the first feedback signal VFB1, and the second feedback signal VFB2 are input to the base drive signal correction circuit 510, similarly to the liquid discharge apparatus 1 of the first embodiment. The base drive signal correction circuit 510 calculates the number of piezoelectric elements 60 to which the drive signal VOUT based on the drive signal COM is supplied based on the print data signal SI to correct the base drive signal dA or the base drive signal aA corresponding to the base drive signal dA based on the calculation result, and adds or subtracts the first feedback signal VFB1 fed back from the first feedback circuit 570 and the second feedback signal VFB2 fed back from the second feedback circuit 572 to generate the correction base drive signal oA and output the correction base drive signal oA to the modulation circuit 520.

The modulation circuit 520 generates a modulation signal MS by modulating the correction base drive signal oA output by the base drive signal correction circuit 510, and outputs the modulation signal MS to the gate drive circuit 530.

The gate drive circuit 530 generates an amplification control signal HGD obtained by level-shifting the modulation signal MS to supply the amplification control signal HGD to the gate of the transistor M1 included in the amplification circuit 550, and generates an amplification control signal LGD obtained by level-shifting a signal obtained by inverting the logic level of the modulation signal MS by the inverter 521 to supply the amplification control signal LGD to the gate of the transistor M2 included in the amplification circuit 550.

The amplification circuit 550 includes transistors M1 and M2. The transistors M1 and M2 operate by the amplification control signals HGD and LGD output by the gate drive circuit 530 to output the amplified modulation signal AMS obtained by amplifying the modulation signal MS. Here, the amplification circuit 550 of the second embodiment outputs the amplified modulation signal AMS by amplifying the modulation signal MS based on the voltage signal VHV1 having a voltage value lower than that of the voltage signal VHV of the first embodiment.

The level shift circuit 70 includes a reference level switching circuit 710, a gate drive circuit 730, diodes D11 and D12, capacitors C11 and C12, transistors M3 and M4, and a bootstrap circuit BS. The level shift circuit 70 generates and outputs a level shift amplified modulation signal LAMS obtained by level-shifting the reference potential of the amplified modulation signal AMS.

The base drive signal dA is input to the reference level switching circuit 710. The reference level switching circuit 710 generates a level switching signal LS based on the input base drive signal dA and outputs the level switching signal LS to the gate drive circuit 730. Specifically, the reference level switching circuit 710 outputs the level switching signal LS having the H level when the voltage value defined by the input base drive signal dA is equal to or higher than a predetermined threshold value, and outputs the level switching signal LS having the L level when the voltage value defined by the input base drive signal dA is less than a predetermined threshold value.

The gate drive circuit 730 includes gate drivers 731 and 732. The level switching signal LS output by the reference level switching circuit 710 is input to the gate driver 731. The gate driver 731 generates and outputs a gate signal TRD1 obtained by level-shifting the input signal. A signal in which the logic level of the level switching signal LS is inverted in the inverter 721 is input to the gate driver 732. The gate driver 732 generates and outputs a gate signal TRD2 obtained by level-shifting the input signal.

The gate signal TRD1 is input to the gate of the transistor M3. The voltage signal VHV3 output by the bootstrap circuit BS is supplied to the drain of the transistor M3. The gate signal TRD2 is input to the gate of the transistor M4. The amplified modulation signal AMS is input to the source of the transistor M4. In addition, the source of the transistor M3 and the drain of the transistor M4 are electrically coupled to each other. The level shift circuit 70 outputs a signal generated at a coupling point to which the source of the transistor M3 and the drain of the transistor M4 are electrically coupled as a level shift amplified modulation signal LAMS.

The bootstrap circuit BS includes a diode D13 and a capacitor C13. A voltage signal VHV2 is supplied to the anode of the diode D13, and the cathode of the diode D13 is electrically coupled to one end of the capacitor C13. In addition, the amplified modulation signal AMS is supplied to the other end of the capacitor C13. Here, the voltage signal VHV2 has a voltage value lower than that of the voltage signal VHV1, and preferably has a voltage value near the voltage signal VHV1.

In the level shift circuit 70 configured as described above, when the potential defined by the base drive signal dA input to the reference level switching circuit 710 is less than a predetermined potential, the reference level switching circuit 710 generates an level switching signal LS having the L level and outputs the level switching signal LS to the gate drive circuit 730. As a result, the gate drive circuit 730 outputs the L level gate signal TRD1 and the H level gate signal TRD2. Therefore, the drain and the source of the transistor M3 is controlled to be non-conductive, and the drain and the source of the transistor M4 is controlled to be conductive. As a result, the amplified modulation signal AMS supplied to the source of the transistor M4 is output from the level shift circuit 70 as the level shift amplified modulation signal LAMS.

On the other hand, when the potential defined by the base drive signal dA input to the reference level switching circuit 710 is equal to or higher than a predetermined potential, the reference level switching circuit 710 generates an level switching signal LS having the H level and outputs the level switching signal LS to the gate drive circuit 730. As a result, the gate drive circuit 730 outputs the H level gate signal TRD1 and the L level gate signal TRD2. Therefore, the drain and the source of the transistor M3 is controlled to be conductive, and the drain and the source of the transistor M4 is controlled to be non-conductive. As a result, the reference potential of the amplified modulation signal AMS supplied to the other end of the capacitor C13 is level-shifted to a potential based on the voltage signal VHV2 supplied to the anode of the diode D13. The amplified modulation signal AMS in which the reference potential is level-shifted to a potential based on the voltage signal VHV2 is output from the level shift circuit 70 as the level shift amplified modulation signal LAMS via the transistor M4.

The level shift amplified modulation signal LAMS output from the level shift circuit 70 is input to the demodulation circuit 560. The demodulation circuit 560 demodulates the level shift amplified modulation signal LAMS output from the level shift circuit 70 by smoothing the level shift amplified modulation signal LAMS, and outputs the level shift amplified modulation signal LAMS from the drive circuit 50 as the drive signal COM.

In addition, the drive signal COM output by the demodulation circuit 560 is input to the base drive signal correction circuit 510 as the first feedback signal VFB1 via the first feedback circuit 570, and is input to the base drive signal correction circuit 510 as the second feedback signal VFB2 via the second feedback circuit 572.

As described above, the drive circuit 50 of the second embodiment switches whether the reference potential of the amplified modulation signal AMS output by the amplification circuit 550 is output as the ground potential or as the voltage signal VHV2 according to the voltage value defined by the base drive signal dA. In such a drive circuit 50, the voltage value of the voltage signal VHV1 which is the amplification voltage of the amplification circuit 550 can be made lower than the voltage signal VHV which is the amplification voltage of the drive circuit 50 of the first embodiment. As a result, the loss of the transistors M1 and M2 included in the amplification circuit 550 can be reduced, and the power consumption in the drive circuit 50 can be reduced.

In addition, even in the drive circuit 50 of the second embodiment, the base drive signal correction circuit 510 calculates the number of piezoelectric elements 60 to which the drive signal VOUT based on the drive signal COM is supplied based on the print data signal SI, and corrects the base drive signal dA or the base drive signal aA corresponding to the base drive signal dA based on the calculation result. Therefore, the same action and effect as those of the liquid discharge apparatus 1 of the first embodiment are obtained.

Although the embodiments and the modification example have been described above, the present disclosure is not limited to these embodiments, and can be implemented in various aspects without departing from the gist thereof. For example, the above embodiments can be combined as appropriate.

The present disclosure includes a configuration substantially the same as the configuration described in the embodiments (for example, a configuration having the same function, method, and result, or a configuration having the same object and effect). In addition, the present disclosure also includes a configuration in which a non-essential part of the configuration described in the embodiments is replaced. In addition, the present disclosure also includes a configuration that exhibits the same action and effect as those of the configuration described in the embodiments or a configuration that can achieve the same object. In addition, the present disclosure also includes a configuration in which a known technique is added to the configuration described in the embodiments.

The following contents are derived from the above-described embodiments.

According to another aspect of the present disclosure, there is provided a liquid discharge apparatus including a liquid discharge head that includes a plurality of capacitive loads driven by being supplied with a drive signal and discharges a liquid by driving the plurality of capacitive loads, and a capacitive load drive circuit that outputs the drive signal, in which the capacitive load drive circuit includes a correction circuit that outputs a correction base drive signal obtained by correcting a base drive signal which is a base of the drive signal, a modulation circuit that outputs a modulation signal obtained by modulating the correction base drive signal, an amplification circuit that outputs an amplified modulation signal obtained by amplifying the modulation signal, a demodulation circuit that includes a capacitor and outputs the drive signal by demodulating the amplified modulation signal, and a feedback circuit that feeds back the drive signal to the correction circuit, in which the correction circuit outputs the correction base drive signal corrected according to the number of drive capacitive loads driven by the drive signal among the plurality of capacitive loads.

According to this liquid discharge apparatus, the correction circuit corrects the base drive signal, which is the base of the drive signal, according to the number of drive capacitive loads driven by the drive signal output by the capacitive load drive circuit, and outputs the base drive signal as a correction base drive signal. Therefore, in the drive signal generated based on the correction base drive signal, even when the capacitance component generated in the propagation path through which the drive signal is propagated changes according to the number of drive capacitive loads to be driven, the possibility that the voltage value of the signal waveform of the drive signal changes is reduced. Therefore, the waveform accuracy of the drive signal output by the capacitive load drive circuit is improved, and the discharge accuracy of the liquid in the liquid discharge apparatus is improved.

In an aspect of the liquid discharge apparatus, the apparatus may further include a switching circuit that switches supply of the drive signal to the plurality of capacitive loads based on discharge data, in which the correction circuit may calculate the number of the drive capacitive loads among the plurality of capacitive loads based on the discharge data.

According to this liquid discharge apparatus, by calculating the number of drive capacitive loads driven based on the discharge data, it is possible to easily and accurately obtain the number of drive capacitive loads driven by the drive signal. As a result, the waveform accuracy of the drive signal output by the capacitive load drive circuit is further improved, and the discharge accuracy of the liquid in the liquid discharge apparatus is further improved.

In an aspect of the liquid discharge apparatus, the feedback circuit may include a high-pass filter.

In an aspect of the liquid discharge apparatus, the feedback circuit may include a low-pass filter.

In an aspect of the liquid discharge apparatus, each of the plurality of capacitive loads may be a piezoelectric element.

In an aspect of the liquid discharge apparatus, when the number of the drive capacitive loads is large, the correction circuit may output the correction base drive signal corrected such that an amplitude of the base drive signal is reduced.

In an aspect of the liquid discharge apparatus, when the number of the drive capacitive loads is small, the correction circuit may output the correction base drive signal corrected such that an amplitude of the base drive signal increases. According to another aspect of the present disclosure, there is provided a capacitive load drive circuit that includes a plurality of capacitive loads to be driven by being supplied with a drive signal and outputs the drive signal to a liquid discharge head which discharges a liquid by driving the plurality of capacitive loads, the circuit including a correction circuit that outputs a correction base drive signal obtained by correcting a base drive signal which is a base of the drive signal, a modulation circuit that outputs a modulation signal obtained by modulating the correction base drive signal, an amplification circuit that outputs an amplified modulation signal obtained by amplifying the modulation signal, a demodulation circuit that includes a capacitor and outputs the drive signal by demodulating the amplified modulation signal, and a feedback circuit that feeds back the drive signal to the correction circuit, in which the correction circuit outputs the correction base drive signal corrected according to the number of drive capacitive loads driven by the drive signal among the plurality of capacitive loads.

According to this capacitive load drive circuit, the correction circuit corrects the base drive signal, which is the base of the drive signal, according to the number of drive capacitive loads driven by the drive signal output by the capacitive load drive circuit, and outputs the base drive signal as a correction base drive signal. Therefore, in the drive signal generated based on the correction base drive signal, even when the capacitance component generated in the propagation path through which the drive signal is propagated changes according to the number of drive capacitive loads to be driven, the possibility that the voltage value of the signal waveform of the drive signal changes is reduced. Therefore, the waveform accuracy of the drive signal output by the capacitive load drive circuit is improved.

What is claimed is:

1. A liquid discharge apparatus comprising:

a liquid discharge head that includes a plurality of capacitive loads driven by being supplied with a drive signal and discharges a liquid by driving the plurality of capacitive loads; and a capacitive load drive circuit that outputs the drive signal, wherein the capacitive load drive circuit includes a correction circuit that outputs a correction base drive signal obtained by correcting a base drive signal which is a base of the drive signal, a modulation circuit that outputs a modulation signal obtained by modulating the correction base drive signal, an amplification circuit that outputs an amplified modulation signal obtained by amplifying the modulation signal, a demodulation circuit that includes a capacitor and outputs the drive signal by demodulating the amplified modulation signal, and a feedback circuit that feeds back the drive signal to the correction circuit, the correction circuit outputs the correction base drive signal corrected according to the number of drive capacitive loads driven by the drive signal among the plurality of capacitive loads, and when the number of the drive capacitive loads is large, the correction circuit outputs the correction base drive signal corrected such that an amplitude of the base drive signal is reduced.

2. The liquid discharge apparatus according to claim 1, further comprising:

a switching circuit that switches supply of the drive signal to the plurality of capacitive loads based on discharge data, wherein the correction circuit calculates the number of the drive capacitive loads among the plurality of capacitive loads based on the discharge data.

3. The liquid discharge apparatus according to claim 1, wherein the feedback circuit includes a high-pass filter.

4. The liquid discharge apparatus according to claim 3, wherein the feedback circuit includes a low-pass filter.

5. The liquid discharge apparatus according to claim 1, wherein each of the plurality of capacitive loads is a piezoelectric element.

6. The liquid discharge apparatus according to claim 1, wherein when the number of the drive capacitive loads is small, the correction circuit outputs the correction base drive signal corrected such that an amplitude of the base drive signal increases.

7. The liquid discharge apparatus according to claim 1, wherein the correction circuit includes:

a counting circuit configured to count a number of the plurality of capacitive loads driven by the drive signal for a predetermined period based on a print data signal to output a drive element number signal; and a correction value calculation circuit configured to calculate a correction value based on the drive element number signal to output a correction signal corresponding to the correction value, the correction base drive signal being formed based on the correction signal.

8. A capacitive load drive circuit that outputs a drive signal to a liquid discharge head which includes a plurality of capacitive loads to be driven by being supplied with the drive signal and discharges a liquid by driving the plurality of capacitive loads, the capacitive load drive circuit comprising:

a correction circuit that outputs a correction base drive signal obtained by correcting a base drive signal which is a base of the drive signal;

a modulation circuit that outputs a modulation signal obtained by modulating the correction base drive signal;

an amplification circuit that outputs an amplified modulation signal obtained by amplifying the modulation signal;

a demodulation circuit that includes a capacitor and outputs the drive signal by demodulating the amplified modulation signal; and a feedback circuit that feeds back the drive signal to the correction circuit, wherein the correction circuit outputs the correction base drive signal corrected according to the number of drive capacitive loads driven by the drive signal among the plurality of capacitive loads, and when the number of the drive capacitive loads is large, the correction circuit outputs the correction base drive signal corrected such that an amplitude of the base drive signal is reduced.

9. The capacitive load drive circuit according to claim 8, wherein when the number of the drive capacitive loads is small, the correction circuit outputs the correction base drive signal corrected such that an amplitude of the base drive signal increases.

10. The capacitive load drive circuit according to claim 8, wherein the correction circuit includes:

a counting circuit configured to count a number of the plurality of capacitive loads driven by the drive signal for a predetermined period based on a print data signal to output a drive element number signal; and a correction value calculation circuit configured to calculate a correction value based on the drive element number signal to output a correction signal corresponding to the correction value, the correction base drive signal being formed based on the correction signal.

* * * * *